(12) United States Patent
Dutta et al.

(10) Patent No.: US 12,317,354 B2
(45) Date of Patent: May 27, 2025

(54) LINK RECOVERY BETWEEN SIDELINK USER EQUIPMENTS BASED AT LEAST IN PART ON KEEP-ALIVE MESSAGES

(71) Applicant: QUALCOMM Incorporated, San Diego, CA (US)

(72) Inventors: Sourjya Dutta, San Diego, CA (US); Kapil Gulati, Belle Mead, NJ (US); Hong Cheng, Basking Ridge, NJ (US); Gabi Sarkis, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/174,270

(22) Filed: Feb. 11, 2021

(65) Prior Publication Data

US 2022/0256636 A1     Aug. 11, 2022

(51) Int. Cl.
| | |
|---|---|
| *H04W 76/19* | (2018.01) |
| *H04L 5/00* | (2006.01) |
| *H04L 43/16* | (2022.01) |
| *H04W 92/18* | (2009.01) |

(52) U.S. Cl.
CPC ........... *H04W 76/19* (2018.02); *H04L 5/0048* (2013.01); *H04L 43/16* (2013.01); *H04W 92/18* (2013.01)

(58) Field of Classification Search
CPC .... H04W 76/19; H04W 92/18; H04L 5/0048; H04L 43/16
See application file for complete search history.

(56) References Cited

U.S. PATENT DOCUMENTS

| | | | |
|---|---|---|---|
| 11,457,355 B2* | 9/2022 | Pan ........................ | H04W 12/50 |
| 2008/0108348 A1* | 5/2008 | Kottilingal ............ | H04W 28/18 |
| | | | 455/435.1 |
| 2017/0311276 A1* | 10/2017 | Tsai ..................... | H04B 7/0695 |
| 2017/0339662 A1* | 11/2017 | Lin .................... | H04W 72/0446 |
| 2019/0327626 A1* | 10/2019 | Zhang .................. | H04L 5/0048 |
| 2022/0046661 A1* | 2/2022 | Jeon .................. | H04W 72/1263 |
| 2022/0097780 A1* | 3/2022 | Rydström ............. | H04W 76/14 |

FOREIGN PATENT DOCUMENTS

WO    WO-2021007802 A1    1/2021

OTHER PUBLICATIONS

Interdigital (Rapporteur) "Report on email discussion on [108#99][V2X] Haro based TX side RLM/RLF", Feb. 24-Mar. 6, 2020, 3GPP Draft; R2-2002074, 3rd Generation Partnership Project (3GPP), Mobile Competence Centre; 650, Route Des Lucioles ; F-06921 Sophia-Antipolis Cedex; Rance (Year: 2020).*

(Continued)

*Primary Examiner* — Walter J Divito
(74) *Attorney, Agent, or Firm* — Harrity & Harrity LLP/QUALCOMM Incorporated

(57) ABSTRACT

Various aspects of the present disclosure generally relate to wireless communication. In some aspects, a first user equipment (UE) may transmit, to a second UE via a sidelink interface, one or more keep-alive request messages. The UE may perform a link recovery with the second UE based at least in part on the one or more keep-alive request messages satisfying a condition. Numerous other aspects are described.

68 Claims, 17 Drawing Sheets

(56) References Cited

OTHER PUBLICATIONS

3GPP TS 23.287: "3rd Generation Partnership Project, Technical Specification Group Services and System Aspects, Architecture Enhancements for 5G System (5GS) to Support Vehicle-to-Everything (V2X) Services (Release 16)", 3GPP Standard, 3rd Generation Partnership Project (3GPP), Mobile Competence Centre, 650, Route Des Lucioles, F-06921 Sophia-Antipolis Cedex, France, vol. SA WG2, No. V16.5.0, Dec. 17, 2020 (Dec. 17, 2020), pp. 1-57, XP051999847, Retrieved from the Internet: URL: https://ftp.3gpp.org/Specs/latest/Rel-16/23_series/23287-g50.zip 23287-g50.docx [retrieved on Dec. 17, 2020] pp. 22, 49.
Interdigital Inc: "RLM/RLF and RRM for NR V2X", 3GPP Draft, 3GPP RAN WG2 Meeting #105, R2-1901579 (R16 V2X SI A11421 RLM_RLF), 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051602934, 4 Pages Retrieved from the Internet: URL: http://www.3gpp.org/ftp/tsg%5Fran/WG2%5FRL2/TSGR2%5F105/Docs/R2%2D1901579%2Ezip, [retrieved on Feb. 15, 2019], p. 4, Section 2, 4, Proposals 1. 4, the whole document.
Interdigital (Rapporteur): "Report on Email Discussion on [108#99] [V2X] HARQ Based Tx Side RLM/RLF", 3GPP TSG-RAN WG2#109e, 3GPP Draft, R2-2002074, 3rd Generation Partnership Project (3GPP), Mobile Competence Centre, 650, Route Des Lucioles, F-06921 Sophia-Antipolis Cedex, France, vol. RAN WG2, No. Feb. 24, 2020-Mar. 6, 2020, pp. 1-37, Feb. 19, 2020 (Feb. 19, 2020), XP051849987, Retrieved from the Internet: URL: https://ftp.3gpp.org/tsg_ran/WG2_RL2/TSGR2_109_e/Docs/R2-2002074.zip R2-2002074—Email discussion report108_99_V2X_RLF_v7.docx [retrieved on Feb. 19, 2020] pp. 2-7, pp. 10-13, pp. 17-25, pp. 27-30.
Interdigital (Rapporteur): "Report on Email Discussion [Post109e#23] [V2X] Remaining RLM/RLF Issue (Interdigital)", 3GPP TSG-RAN WG2 Meeting #109bis-e, 3GPP Draft, R2-2004180, 3rd Generation Partnership Project (3GPP), Mobile Competence Centre, 650, Route Des Lucioles, F-06921 Sophia-Antipolis Cedex, France, vol. RAN WG2, No. Online Meeting, Electronic, Apr. 20, 2020-Apr. 30, 2020, pp. 1-34, May 1, 2020 (May 1, 2020), XP051879402, Retrieved from the Internet: URL: https://ftp.3gpp.org/tsg_ran/WG2_RL2/TSGR2_109bis-e/Docs/R2-2004180.zip R2-2004180—Email discussion report Post109e_23_V2X_RLF_v3_.docx [retrieved on May 1, 2020] pp. 1-10, pp. 16-18, pp. 20-22, pp. 26-31.
International Search Report and Written Opinion—PCT/US2022/070201—ISA/EPO—May 12, 2022.
LG Electronics Inc: "PC5 Link Failure Handling for NR Sidelink Relay", 3GPP TSG-RAN WG2 Meeting #112e, 3GPP Draft, R2-2010652, 3rd Generation Partnership Project (3GPP), Mobile Competence Centre, 650, Route Des Lucioles, F-06921 Sophia-Antipolis Cedex, France, vol. RAN WG2, No. Online Meeting, Nov. 2, 2020-Nov. 13, 2020, pp. 1-3, Oct. 23, 2020 (Oct. 23, 2020), XP051943308, Retrieved from the Internet: URL: https://ftp.3gpp.org/tsg_ran/WG2_RL2/TSGR2_112-e/Docs/R2-2010652.zip R2-2010652 PC5 link failure handling for NR sidelink relay.docx [retrieved on Oct. 23, 2020] the whole document.
ZTE Corporation, et al., "Discussion on RRC Remaining Issues", 3GPP TSG RAN WG2 Meeting #109bis electronic, 3GPP Draft, R2-2002564, 3rd Generation Partnership Project (3GPP), Mobile Competence Centre, 650, Route Des Lucioles, F-06921 Sophia-Antipolis Cedex, France, vol. RAN WG2, No. Electronic meeting, Apr. 20, 2020-Apr. 24, 2020, pp. 1-9, Apr. 10, 2020 (Apr. 10, 2020), XP051870849, Retrieved from the Internet: URL: https://ftp.3gpp.org/tsg_ran/WG2_RL2/TSGR2_109bis-e/Docs/R2-2002564.zip R2-2002564 Discussion on RRC remaining issues.doc [retrieved on Apr. 10, 2020] pp. 3, 5-8.
3GPP: "3rd Generation Partnership Project, Technical Specification Group Core Network and Terminals, Vehicle-to-Everything (V2X) services in 5G System (5GS), Stage 3 (Release 16)", 3GPP TS 24.587, V16.3.0, Dec. 2020, pp. 1-107.

* cited by examiner

LINK RECOVERY BETWEEN SIDELINK USER EQUIPMENTS BASED AT LEAST IN PART ON KEEP-ALIVE MESSAGES

INTRODUCTION

Aspects of the present disclosure generally relate to wireless communication and to techniques and apparatuses for link recovery between sidelink user equipments (UEs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of UEs. A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first UE includes transmitting, to a second UE via a sidelink interface, one or more keep-alive request messages. The method further includes performing a link recovery with the second UE based at least in part on the one or more keep-alive request messages satisfying a condition.

In some aspects, a method of wireless communication performed by a first UE includes receiving, from a second UE via a sidelink interface, a keep-alive request message. The method further includes transmitting, to the second UE, a keep-alive response message that indicates a link recovery in a next beam training occasion.

In some aspects, a method of wireless communication performed by a first UE includes receiving, from a second UE, keep-alive request messages over a period of time via a sidelink interface between the first UE and the second UE. The method further includes determining a block error rate (BLER) associated with the keep-alive request messages received over the period of time. The method further includes performing a link recovery with the second UE based at least in part on the BLER satisfying a threshold.

In some aspects, a method of wireless communication performed by a first UE includes transmitting, to a second UE, keep-alive request messages via a sidelink interface between the first UE and the second UE. The method further includes determining a BLER for the keep-alive request messages over a period of time based at least in part on one or more keep-alive response messages received from the second UE. The method further includes performing a link recovery with the second UE based at least in part on the BLER satisfying a threshold.

In some aspects, a first UE for wireless communication includes a memory and one or more processors operatively coupled to the memory. The memory and the one or more processors are configured to transmit, to a second UE via a sidelink interface, one or more keep-alive request messages. The memory and the one or more processors are configured to perform a link recovery with the second UE based at least in part on the one or more keep-alive request messages satisfying a condition.

In some aspects, a first UE for wireless communication includes a memory and one or more processors operatively coupled to the memory. The memory and the one or more processors are configured to receive, from a second UE via a sidelink interface, a keep-alive request message. The memory and the one or more processors are configured to transmit, to the second UE, a keep-alive response message that indicates a link recovery in a next beam training occasion.

In some aspects, a first UE for wireless communication includes a memory and one or more processors operatively coupled to the memory. The memory and the one or more processors are configured to receive, from a second UE, keep-alive request messages over a period of time via a sidelink interface between the first UE and the second UE. The memory and the one or more processors are configured to determine a BLER associated with the keep-alive request messages received over the period of time. The memory and the one or more processors are configured to perform a link recovery with the second UE based at least in part on the BLER satisfying a threshold.

In some aspects, a first UE for wireless communication includes a memory and one or more processors operatively coupled to the memory. The memory and the one or more processors are configured to transmit, to a second UE, keep-alive request messages via a sidelink interface between the first UE and the second UE. The memory and the one or more processors are configured to determine a BLER for the keep-alive request messages over a period of time based at least in part on one or more keep-alive response messages received from the second UE. The memory and the one or more processors are configured to perform a link recovery with the second UE based at least in part on the BLER satisfying a threshold.

In some aspects, a non-transitory computer-readable medium storing a set of instructions for wireless communication includes one or more instructions that, when executed by one or more processors of a first UE, cause the first UE to transmit, to a second UE via a sidelink interface, one or more keep-alive request messages. The one or more instructions, when executed by one or more processors of a first UE, cause the first UE to perform a link recovery with the second UE based at least in part on the one or more keep-alive request messages satisfying a condition.

In some aspects, a non-transitory computer-readable medium storing a set of instructions for wireless communication includes one or more instructions that, when executed by one or more processors of a first UE, cause the first UE to receive, from a second UE via a sidelink interface, a keep-alive request message. The one or more instructions, when executed by one or more processors of a first UE, cause the first UE to transmit, to the second UE, a keep-alive response message that indicates a link recovery in a next beam training occasion.

In some aspects, a non-transitory computer-readable medium storing a set of instructions for wireless communication includes one or more instructions that, when executed by one or more processors of a first UE, cause the first UE to receive, from a second UE, keep-alive request messages over a period of time via a sidelink interface between the first UE and the second UE. The one or more instructions, when executed by one or more processors of the first UE, cause the first UE to determine a BLER associated with the keep-alive request messages received over the period of time. The one or more instructions, when executed by one or more processors of the first UE, cause the first UE to perform a link recovery with the second UE based at least in part on the BLER satisfying a threshold.

In some aspects, a non-transitory computer-readable medium storing a set of instructions for wireless communication includes one or more instructions that, when executed by one or more processors of a first UE, cause the first UE to transmit, to a second UE, keep-alive request messages via a sidelink interface between the first UE and the second UE. The one or more instructions, when executed by one or more processors of the first UE, cause the first UE to determine a BLER for the keep-alive request messages over a period of time based at least in part on one or more keep-alive response messages received from the second UE. The one or more instructions, when executed by one or more processors of the first UE, cause the first UE to perform a link recovery with the second UE based at least in part on the BLER satisfying a threshold.

In some aspects, a first apparatus for wireless communication includes means for transmitting, to a second apparatus via a sidelink interface, one or more keep-alive request messages. The first apparatus includes means for performing a link recovery with the second apparatus based at least in part on the one or more keep-alive request messages satisfying a condition.

In some aspects, a first apparatus for wireless communication includes means for receiving, from a second apparatus via a sidelink interface, a keep-alive request message. The first apparatus includes means for transmitting, to the second apparatus, a keep-alive response message that indicates a link recovery in a next beam training occasion.

In some aspects, a first apparatus for wireless communication includes means for receiving, from a second apparatus, keep-alive request messages over a period of time via a sidelink interface between the first apparatus and the second apparatus. The first apparatus includes means for determining a BLER associated with the keep-alive request messages received over the period of time. The first apparatus includes means for performing a link recovery with the second apparatus based at least in part on the BLER satisfying a threshold.

In some aspects, a first apparatus for wireless communication includes means for transmitting, to a second apparatus, keep-alive request messages via a sidelink interface between the first apparatus and the second apparatus. The first apparatus includes means for determining a BLER for the keep-alive request messages over a period of time based at least in part on one or more keep-alive response messages received from the second apparatus. The first apparatus includes means for performing a link recovery with the second apparatus based at least in part on the BLER satisfying a threshold.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
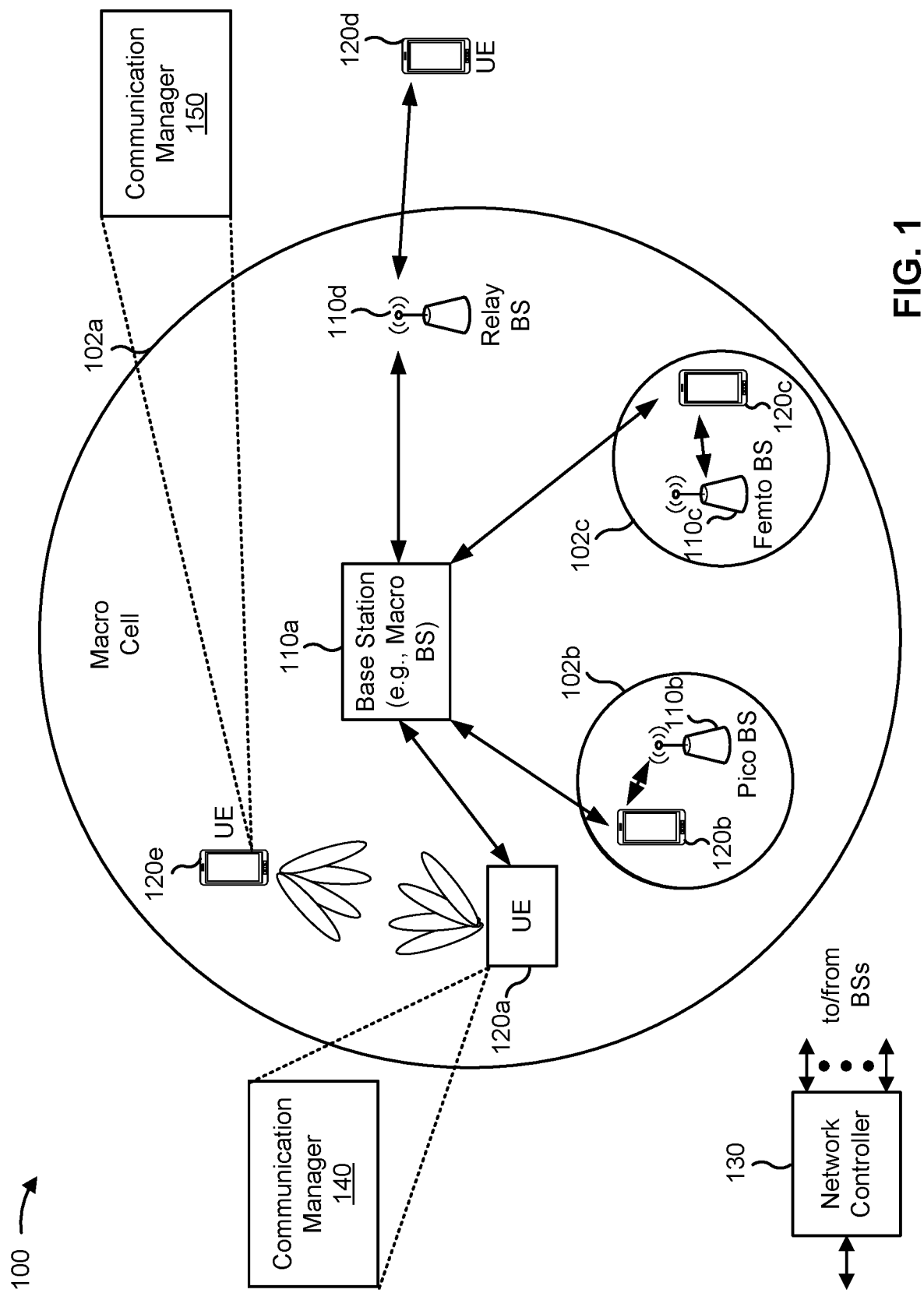
FIG. 1 is a diagram illustrating an example of a wireless network, in accordance with the present disclosure.

Sidelink networks may be distributed in nature, such that a single UE may have separate sidelink connections with multiple UEs. A first UE may determine a BLER based at least in part on data communications with a second UE, and the first UE may determine a beam/link failure with the second UE based at least in part on the BLER in relation to a threshold. The BLER may indicate a probability with which a transport block, of a given size encoded with a given modulation and coding scheme, may fail to be decoded at the first UE when transmitted from the second UE. When a link between the first UE and the second UE is idle for an extended period of time due to burstiness of traffic, a BLER and a resulting beam/link failure determination may be affected by the burstiness of the traffic.

In some aspects, beam/link failure between the first UE and the second UE may be determined based at least in part on keep-alive messages, which may be used to monitor link inactivity between the first UE and the second UE. In some aspects, the first UE and/or the second UE may determine the beam/link failure based at least in part on a keep-alive counter value associated with the keep-alive messages. For example, the first UE may transmit, to the second UE, one or more keep-alive request messages based at least in part on the keep-alive counter value. The keep-alive counter value may be less than a keep-alive maximum counter value that triggers a release of local context information at the first UE. The local context information may include information associated with the first UE and/or the second UE that enables the first UE to maintain a sidelink connection with the second UE and may associate various processes for radio operations with traffic flows, applications, etc. When the keep-alive maximum counter value is reached due to link inactivity, the first UE may release the local context information. The first UE may perform a link recovery with the second UE based at least in part on the keep-alive counter value being reached.

In some aspects, the first UE and/or the second UE may determine a BLER and a link/beam failure based at least in part on keep-alive messages. The keep-alive messages may be PC5 keep-alive messages or other types of keep-alive messages. In some aspects, the keep-alive messages may enable peer UEs to determine the BLER and the link/beam failure, and may help the peer UEs to distinguish whether an idleness is due to a traffic pattern or due to the link/beam failure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). The two or more UEs 120 may communicate using a plurality of beams. For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, may communicate using an operating band having a second frequency range (FR2), which may span from 24.25 GHz to 52.6 GHz, may communicate using an operating band having a third frequency range (FR3), which may span from 7.125 GHz to 24.25 GHz, and/or may communicate using an operating band having a fourth frequency range (FR4), which may span from 52.6 GHz to 114 GHz. Note that FR3 is between FR1 and FR2, and FR4 is above FR2. The frequencies between FR1 and FR2 (e. g, in FR3) are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1, FR2, FR3, and FR4 may be modified, and techniques described herein are applicable to those modified frequency ranges.

As shown in FIG. 1, the UE 120a may include a communication manager 140. As described in more detail elsewhere herein, the communication manager 140 may transmit, to the UE 120e via a sidelink interface, one or more keep-alive request messages based at least in part on a keep-alive counter value that is less than a keep-alive maximum counter value that triggers a release of local context information at the UE 120a. The communication manager 140 may perform a link recovery with the UE 120e based at least in part on the keep-alive counter value being reached. Additionally, or alternatively, the communication manager 140 may perform one or more other operations described herein.

In some aspects, the communication manager 140 may receive, from UE 120e, keep-alive request messages over a period of time via a sidelink interface between the UE 120a and the UE 120e. The communication manager 140 may determine a BLER associated with the keep-alive request messages received over the period of time. The communication manager 140 may perform a link recovery with the UE 120e based at least in part on the BLER satisfying a threshold.

In some aspects, the UE 120e may include a communication manager 150. As described in more detail elsewhere herein, the communication manager 150 may receive, from the UE 120a via a sidelink interface, a keep-alive request message that satisfies a keep-alive counter value that is less than a keep-alive maximum counter value that triggers a release of local context information at the UE 120e. The communication manager 150 may transmit, to the UE 120a, a keep-alive response message that indicates a link recovery in a next beam training occasion. Additionally, or alternatively, the communication manager 150 may perform one or more other operations described herein.

In some aspects, the communication manager 150 may transmit, to the UE 120a, keep-alive request messages via a sidelink interface between the UE 120e and the UE 120a. The communication manager 150 may determine a BLER for the keep-alive request messages over a period of time based at least in part on one or more keep-alive response messages received from the UE 120a. The communication manager 150 may perform a link recovery with the UE 120a based at least in part on the BLER satisfying a threshold.

As indicated above, FIG. 1 is provided merely as an example. Other examples may differ from what is described with regard to FIG. 1.

Figure 2:
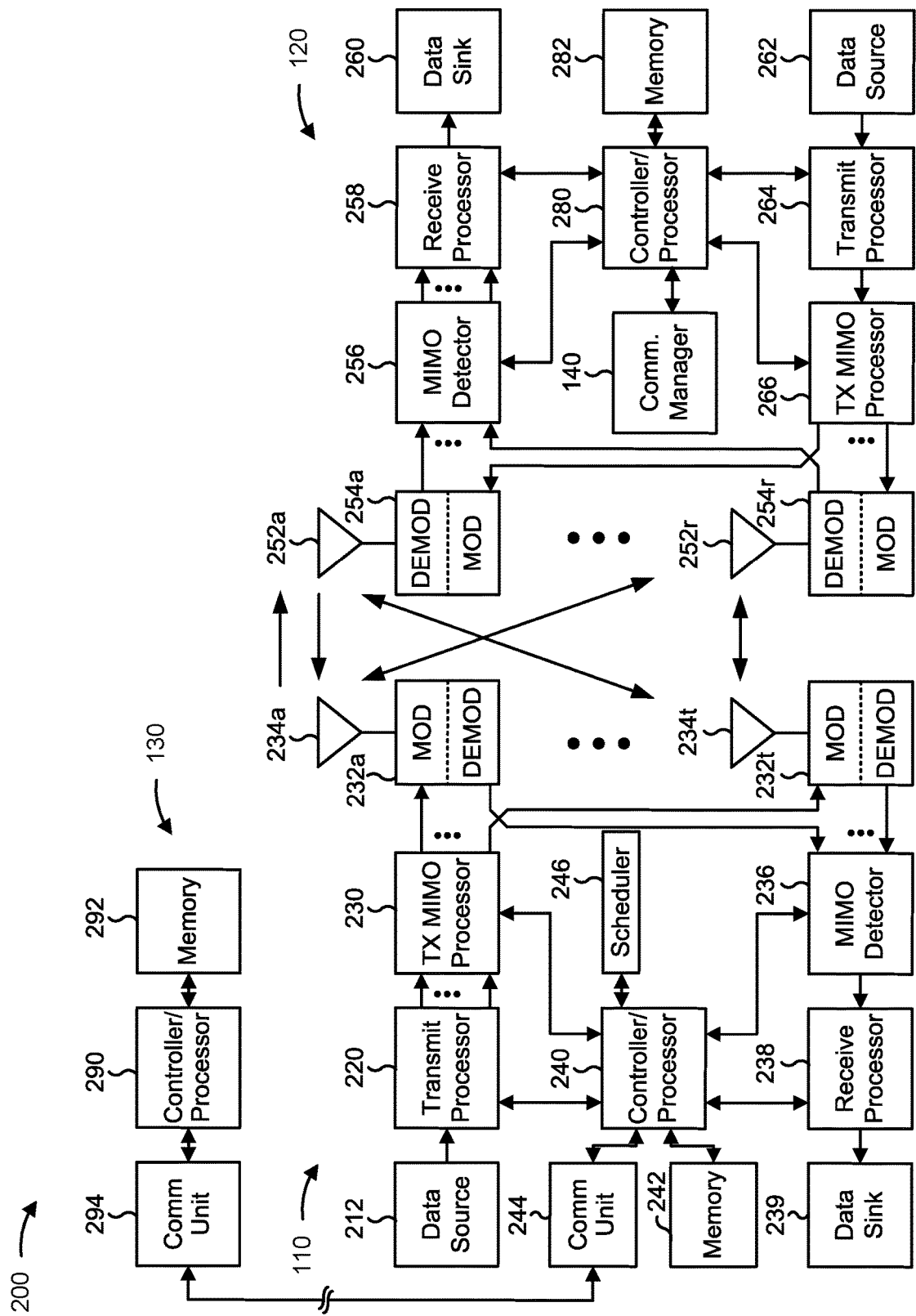
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with link recovery between sidelink UEs based at least in part on keep-alive messages, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a first user UE (e.g., UE 120a) includes means for transmitting, to a second UE (e.g., UE 120e) via a sidelink interface, one or more keep-alive request messages; and/or means for performing a link recovery with the second UE based at least in part on the one or more keep-alive request messages satisfying a condition. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for modifying one or more keep-alive parameters associated with the one or more keep-alive request messages to obtain one or more modified keep-alive parameters; and/or means for transmitting, to the second UE, an indication of the one or more modified keep-alive parameters. In some aspects, the first UE includes means for modifying the one or more keep-alive parameters to increase a frequency of the one or more keep-alive request messages based at least in part on a link quality between the first UE and the second UE not satisfying a threshold.

In some aspects, the first UE includes means for modifying the one or more keep-alive parameters to decrease a frequency of the one or more keep-alive request messages based at least in part on a link quality between the first UE and the second UE satisfying a threshold for a period of time. In some aspects, the first UE includes means for performing the link recovery until a link between the first UE and the second UE is successfully recovered; and/or means for performing the link recovery until the keep-alive maximum counter value is reached. In some aspects, the UE includes means for transmitting beam training reference signals (BT-RSs) until the second UE is rediscovered; and/or means for transmitting BT-RSs until the keep-alive maximum counter value is reached, wherein the BT-RSs are transmitted based at least in part on a radio resource control configuration associated with a link between the first UE and the second UE.

In some aspects, the first UE includes means for receiving, from the second UE via a sidelink interface, a keep-alive request message; and/or means for transmitting, to the second UE, a keep-alive response message that indicates a link recovery in a next beam training occasion.

In some aspects, the first UE includes means for performing the link recovery based at least in part on monitoring a channel for BT-RSs from the second UE. In some aspects, the first UE includes means for performing the link recovery based at least in part on monitoring a channel for BT-RSs until the keep-alive maximum counter value is reached, wherein the channel is monitored for the BT-RSs based at least in part on a radio resource control configuration associated with a link between the first UE and the second UE.

In some aspects, the first UE includes means for receiving, from the second UE, keep-alive request messages over a period of time via a sidelink interface between the first UE and the second UE; means for determining a BLER associated with the keep-alive request messages received over the period of time; and/or means for performing a link recovery with the second UE based at least in part on the BLER satisfying a threshold.

In some aspects, the first UE includes means for transmitting, to the second UE, keep-alive request messages via a sidelink interface between the first UE and the second UE; means for determining a BLER for the keep-alive request messages over a period of time based at least in part on one or more keep-alive response messages received from the second UE; and/or means for performing a link recovery with the second UE based at least in part on the BLER satisfying a threshold.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

For sidelink communications over FR2, FR2 links may use beamforming to allow sidelink communications over a given range, due to relatively high pathloss. Beam search and periodic beam training may be used to maintain the FR2 links. Sidelink communications allow for device-to-device communication, with or without assistance from a base station. Further, sidelink networks may be distributed, such that each device may maintain communication links with multiple peer devices. For example, a UE may maintain sidelink communication links with multiple other UEs.

Sidelink communication over FR2, or a millimeter (mm-Wave) band, may be different than communication for cellular applications. For example, in cellular, a UE may maintain a link with one base station (e.g., a Uu interface), or one access point in a WiFi scenario. In sidelink, UEs may create and monitor multiple beam pair links with other UEs.

For distributed sidelink communication over FR2, network-wide periodic resources may be semi-statically configured for beam search and training. These resources may span over a relatively long period, as multiple UEs may create/maintain links with one another. These resources may occur with longer periods to reduce overhead. For example, a 100 ms beam training window may be configured every 1000 ms, thereby resulting in 10% overhead. Beam search and training may be performed in between network-wide resources to enhance link throughput and reliability.

Radio link monitoring (RLM) and beam/link failure detection mechanisms, such as radio link failure (RLF) detection, may be applicable to sidelink communications over FR2. A beam/link failure may be a link condition at which control decoding fails with a probability that satisfies a threshold. In sidelink, two peer UEs may need to determine and mitigate the link/beam failure without periodic reference signals from the base station.

For FR2 cellular (Uu interface) applications, RLM may be performed based at least in part on periodic reference signals. A UE may use a periodic channel state information reference signal (CSI-RS), or a primary synchronization signal (PSS) or a secondary synchronization signal (SSS), to determine a hypothetical block error rate (BLER) for a control channel. Other UEs may receive an indication that the CSI-RS or the SSS are scheduled at a fixed periodicity. When a physical downlink control channel (PDCCH) hypothetical BLER does not satisfy a threshold (e.g., a PDCCH hypothetical BLER falls below a threshold), UEs may trigger a link failure mitigation procedure.

Sidelink networks may be distributed in nature, such that each UE may have multiple connections with multiple UEs. Sidelink networks may not have a provision for periodic reference signals or synchronization signals between two UEs. Thus, a measured BLER may be computed based at least in part on data transmissions to determine the beam/link failure, as periodic reference signals may not be provisioned for sidelink traffic, which may be difficult when links are idle for extended periods of time due to burstiness of traffic. Further, a base station may transmit synchronization signals, so a UE determining link failure may listen on these synchronization resources for link reestablishment. Sidelink UEs may not transmit beam training signals on every beam training occasion, so to mitigate a beam failure event, both UEs may need to identify that a beam/link failure has occurred. However, during the beam failure event, one UE may not be able to send a failure indication to peer UEs over FR2.

In various aspects of techniques and apparatuses described herein, a first UE may transmit, to a second UE, one or more keep-alive request messages based at least in part on a keep-alive counter value. The keep-alive counter value may be less than a keep-alive maximum counter value that triggers a release of local context information at the first UE. The first UE may perform a link recovery with the second UE based at least in part on the keep-alive counter value being reached. In other words, the link recovery may be triggered based at least in part on the keep-alive counter value. In some aspects, the first UE may receive, from the second UE, keep-alive request messages over a period of time. The first UE may determine a BLER associated with the keep-alive request messages received over the period of time. The first UE may perform a link recovery with the second UE based at least in part on the BLER satisfying a threshold. In other words, the link recovery may be triggered based at least in part on the BLER associated with the keep-alive request messages. In some aspects, the first UE and/or the second UE may perform the link recovery based at least in part on the keep-alive counter value and/or the BLER associated with the keep-alive request messages. In some aspects, the first UE and the second UE may communicate via a sidelink interface on FR2, FR3, FR4, or any other suitable frequency range. In some aspects, BLER computations and/or link/beam failure determinations may be performed based at least in part on keep-alive messages, such as PC5 keep-alive messages.

Figure 3A:
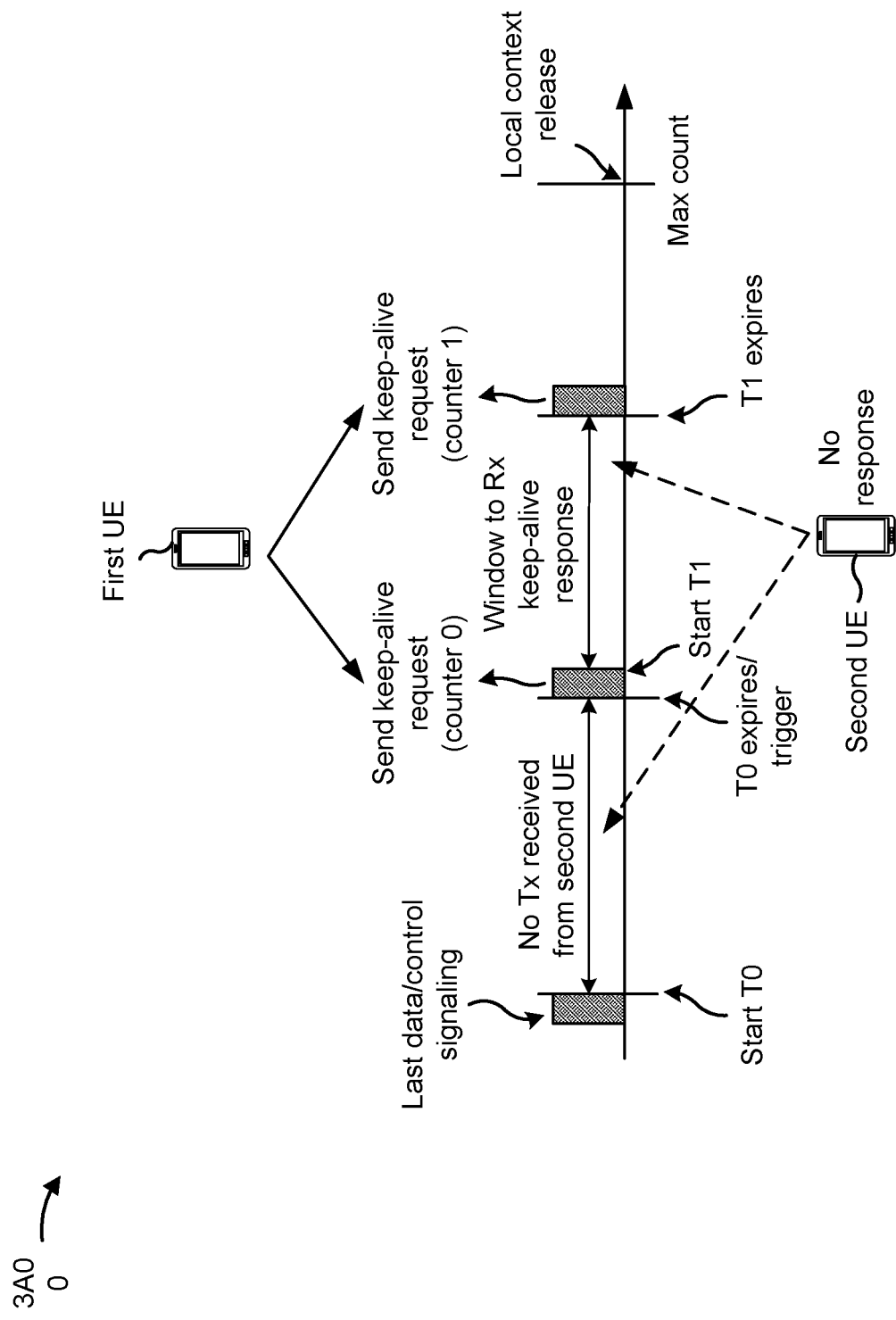
FIGS. 3A and 3B are diagrams illustrating example of keep-alive mechanisms, in accordance with the present disclosure.

FIG. 3A is a diagram illustrating an example 300 of a keep-alive mechanism, in accordance with the present disclosure.

As shown in FIG. 3A, a keep-alive mechanism, such as a PC5 keep-alive mechanism, may be used to monitor link inactivity between a first UE and a second UE. The first UE may start a timer T0 after a packet is transmitted or received at the first UE. For example, the first UE may start the timer T0 after a last data/control signaling. When the timer T0 expires and no new packet is transmitted over the link between the first UE and the second UE, the first UE may transmit a keep-alive request message to the second UE. The first UE may start a timer T1 based at least in part on transmitting the keep-alive request message. For example, the first UE may start the timer T1 after sending the keep-alive request message. The first UE may receive a keep-alive response message, and the timer T1 may be reset and the timer T0 may be set. The receipt of the keep-alive response message may indicate that the link between the first UE and the second UE is established. When the first UE does not receive the keep-alive response message, the timer T1 may expire and the first UE may transmit another keep-alive request message to the second UE. Further, the first UE may increase a keep-alive counter value. When the first UE continues to not receive the keep-alive response message, the keep-alive counter value may reach a maximum threshold. The first UE may determine that the link with the second UE is no longer valid, and the first UE may release local context information. The local context information may include information associated with the first UE and/or the second UE that enables the first UE to maintain a sidelink connection with the second UE. When the keep-alive counter value reaches the maximum threshold, the first UE may infer that the sidelink connection with the second UE may be discontinued, so the local context information may be released.

The keep-alive mechanism may apply to protocol layers other than PC5. For example, the keep-alive request message may be transmitted on a request from an upper or lower layer, such as a radio resource control (RRC) layer, a packet data convergence protocol (PDCP) layer, a radio link control (RLC) layer, a media access control (MAC) layer, or a physical (PHY) layer.

As indicated above, FIG. 3A is provided merely as an example. Other examples may differ from what is described with regard to FIG. 3A.

Figure 3B:
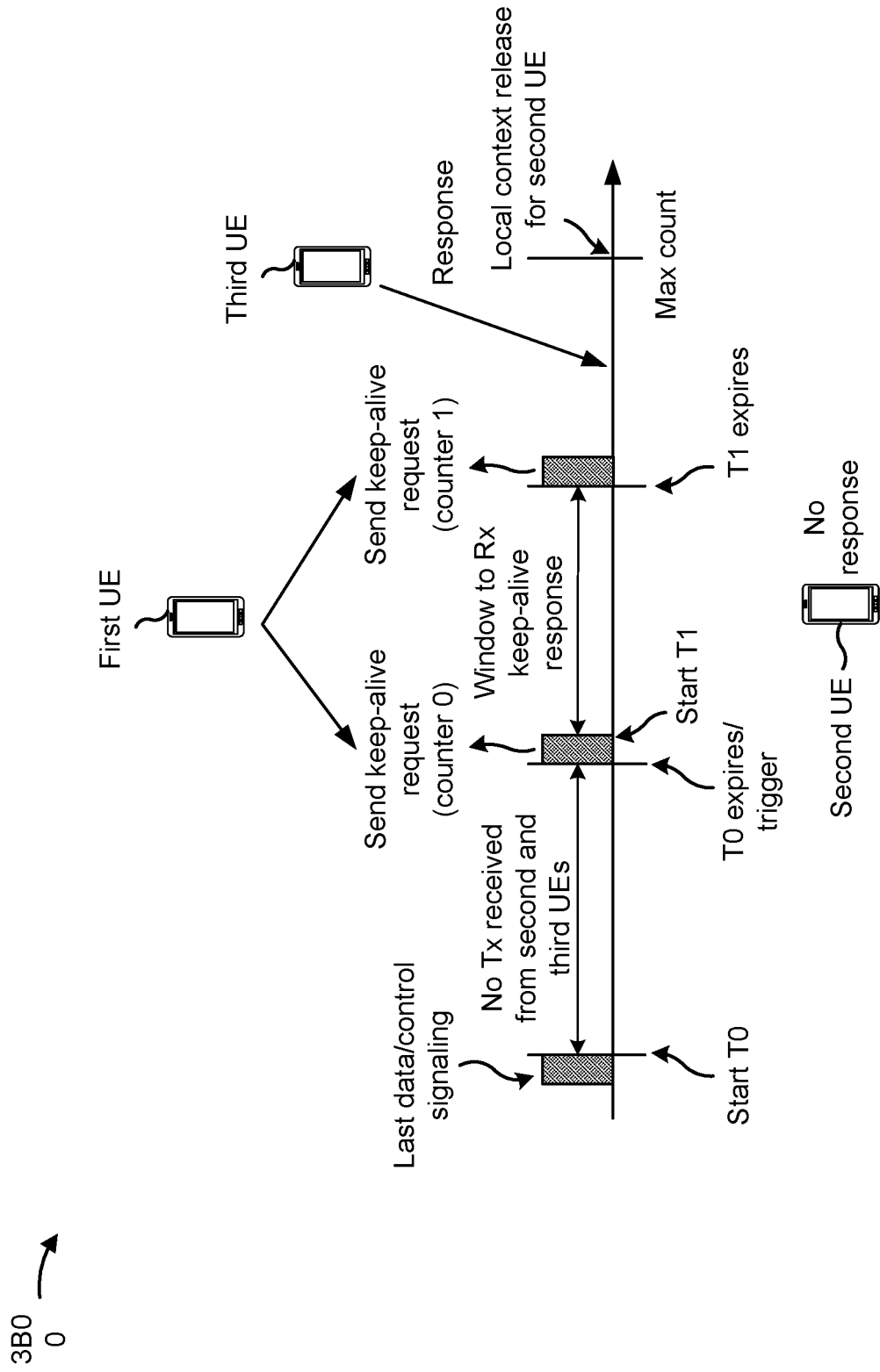

FIG. 3B is a diagram illustrating an example 310 of a keep-alive mechanism, in accordance with the present disclosure.

As shown in FIG. 3B, a keep-alive mechanism, such as a PC5 keep-alive mechanism, may be used to monitor link inactivity between a first UE, a second UE, and a third UE. The first UE may start a timer T0 after a packet is transmitted or received at the first UE. When the timer T0 expires and no new packet is transmitted over a link with the second UE and the third UE, the first UE may transmit a keep-alive request message to the second UE and the third UE, respectively. The first UE may start a timer T1 based at least in part on transmitting the keep-alive request messages to the second UE and the third UE. The timer T1 may be separate for the second UE and the third UE. When the first UE does not receive a keep-alive response message from the second UE, the timer T1 associated with the second UE may expire and the first UE may transmit another keep-alive request message to the second UE. When the first UE does not receive a keep-alive response message from the third UE, the timer T1 associated with the third UE may expire and the first UE may transmit another keep-alive request message to the third UE. When the first UE receives a keep-alive response message from the third UE, the first UE may restart the timer T0. When the first UE does not receive a keep-alive response from the second UE, the first UE may release local context information associated with the second UE.

As indicated above, FIG. 3B is provided merely as an example. Other examples may differ from what is described with regard to FIG. 3B.

Figure 4:
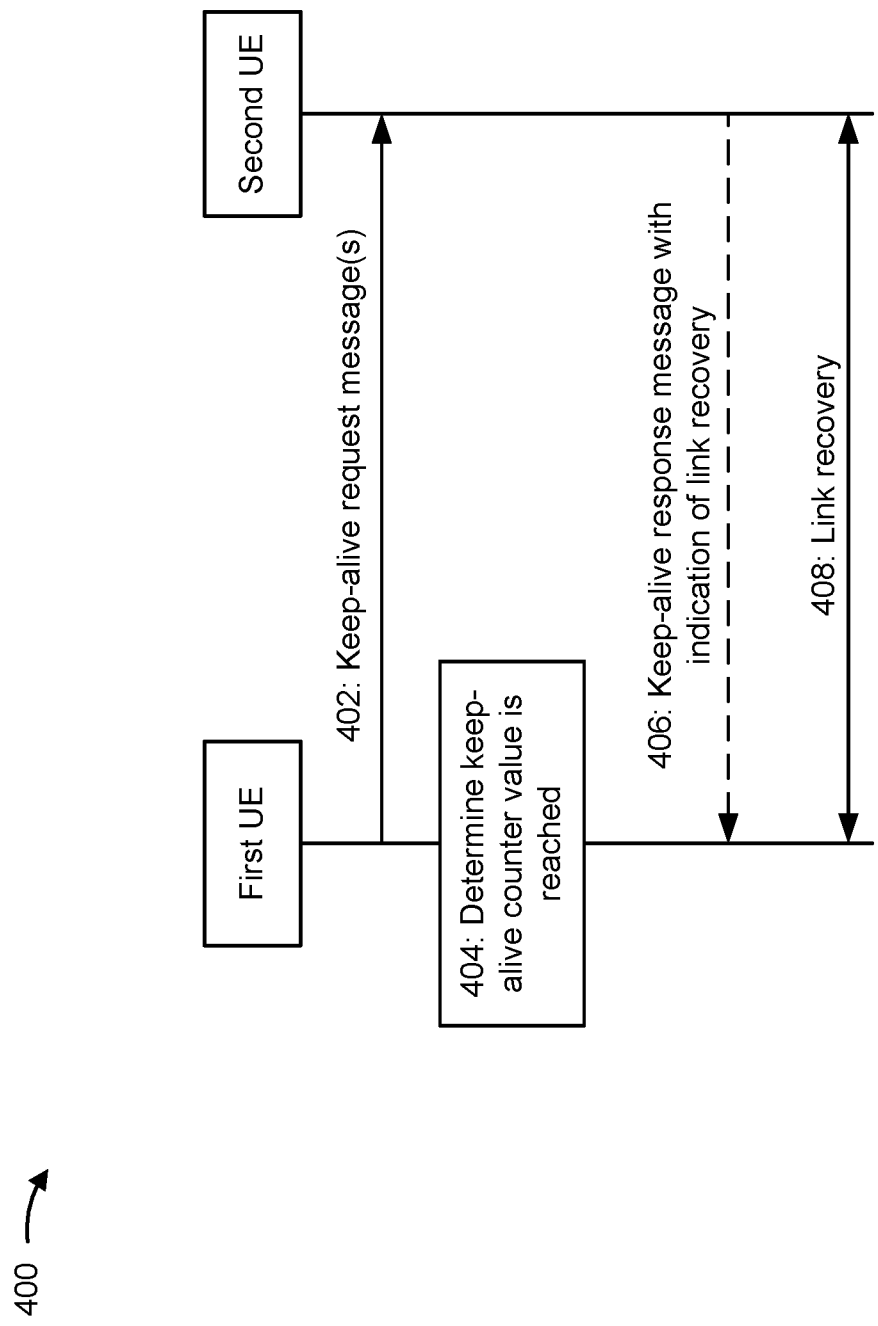
FIG. 4 is a diagram illustrating an example associated with link recovery between sidelink UEs based at least in part on keep-alive messages, in accordance with the present disclosure.

FIG. 4 is a diagram illustrating an example 400 associated with link recovery between sidelink UEs based at least in part on keep-alive messages, in accordance with the present disclosure. As shown in FIG. 4, example 400 includes communication between a first UE (e.g., UE 120*a*) and a second UE (e.g., UE 120*e*). In some aspects, the first UE and the second UE may be included in a wireless network such as wireless network 100. In some aspects, the first UE and the second UE may communicate over a sidelink.

As shown by reference number 402, the first UE may transmit, to the second UE via a sidelink interface between the first UE and the second UE, keep-alive request messages. The first UE may transmit the keep-alive request messages based at least in part on keep-alive parameters. The keep-alive parameters may indicate a keep-alive counter value, and other appropriate timer values or counter values for link recovery based at least in part on the keep-alive messages. The keep-alive counter value may be less than a keep-alive maximum counter value that, when reached, may trigger a release of local context information at the first UE. More specifically, the keep-alive parameters may indicate a keep-alive counter value, which may be less than a keep-alive maximum counter value that, when reached, may trigger the release of the local context information at the first UE. In some aspects, the keep-alive parameters may indicate both the keep-alive counter value and the keep-alive maximum counter value.

The keep-alive parameters may be defined during a sidelink connection establishment or a sidelink connection update between the first UE and the second UE.

In some aspects, the first UE may modify the keep-alive parameters to obtain modified keep-alive parameters. The first UE may modify the keep-alive parameters based at least in part on measurement reports, congestion measurements, and/or UE mobility. The first UE may transmit, to the second UE, an indication of the modified keep-alive parameters.

In some aspects, the first UE may receive a measurement report from the second UE that indicates a link quality between the first UE and the second UE. The first UE may generate, based at least in part on a signal received from the second UE, the measurement report that indicates the link quality. The first UE may receive the congestion measurements from the second UE. The first UE may modify the keep-alive parameters, such as the keep-alive counter value and the keep-alive maximum counter value, based at least in part on the measurement reports and/or the congestion measurements.

In some aspects, the first UE may modify the keep-alive parameters to increase a frequency of the keep-alive request messages based at least in part on a link quality between the first UE and the second UE not satisfying a threshold. In some aspects, the first UE may modify the keep-alive parameters to decrease a frequency of the keep-alive request messages based at least in part on a link quality between the first UE and the second UE satisfying a threshold for a period of time.

In some aspects, the first UE may receive an indication of the threshold from a base station or the second UE. The first UE may receive the indication of the threshold from the base station via RRC signaling or a medium access control-control element (MAC-CE).

In some aspects, the link quality may satisfy the threshold when a link between the first UE and the second UE supports a data transmission rate that satisfies a threshold.

In some aspects, the first UE may transmit the keep-alive request messages based at least in part on one or more measurement reports indicating that a link quality between the first UE and the second UE does not satisfy a threshold. In some aspects, the first UE may transmit the keep-alive request messages based at least in part on a quantity of hybrid automatic repeat request (HARQ) transmissions satisfying a threshold. In some aspects, the first UE may transmit the keep-alive request messages based at least in part on an indication of an RLC layer retransmission.

In some aspects, a PC5 layer of the first UE may trigger a keep-alive mechanism based at least in part on a pre-configured keep-alive timer, which may be negotiated, defined, or configured during a sidelink connection establishment or update procedure with the second UE. In some aspects, the PC5 layer of the first UE may update keep-alive related timers and/or counter values based at least in part on an indication received from the RRC layer or an access stratum (AS) layer of the first UE.

In some aspects, based at least in part on received or generated measurement reports, the RRC layer of the first UE may notify the PC5 layer of the first UE to increase or decrease a frequency of PC5 keep-alive request message transmissions. The frequency of the PC5 keep-alive request message transmissions may be increased or decreased based at least in part on modifying the keep-alive parameters, such as a timer T0 and a timer T1. For example, the frequency may be increased when the link between the first UE and the second UE does not satisfy a threshold (e.g., the link becomes poor), or the frequency may be decreased when the link between the first UE and the second UE satisfies the threshold (e.g., the link is stable for a period of time). In some aspects, the keep-alive parameters may be modified based at least in part on congestion parameters and/or UE mobility.

In some aspects, the keep-alive mechanism may be a PC5 keep-alive mechanism or a ProSe direct link keep-alive mechanism.

In some aspects, the PC5 layer of the first UE may modify the keep-alive parameters to obtain modified keep-alive parameters, and the PC5 layer may notify the second UE of the modified keep-alive parameters based at least in part on a PC5 direct link modification request. For example, the PC5 direct link modification request may include an indication of the modified keep-alive parameters (e.g., timer T0 and timer T1).

In some aspects, the RRC layer of the first UE may request the PC5 layer to trigger the keep-alive mechanism based at least in part on PHY measurements or measurement reports that indicate that the link between the first UE and the second UE does not satisfy the threshold (e.g., the link is weak or is intermittent for an extended period of time). In some aspects, the RRC layer may request the PC5 layer to trigger the keep-alive mechanism based at least in part on a quantity of HARQ retransmissions satisfying a threshold (e.g., HARQ retransmissions exceeding a configured number of retransmissions is frequent). In some aspects, the RRC layer may request the PC5 layer to trigger the keep-alive mechanism based at least in part on one or more RLC layer retransmissions.

As shown by reference number 404, the first UE may determine that the keep-alive counter value has been reached. In some aspects, the keep-alive counter value may be reached based at least in part on a quantity of keep-alive request messages being transmitted without receiving corresponding keep-alive response messages from the second UE.

As shown by reference number 406, the first UE may receive, from the second UE, a keep-alive response message that indicates a link recovery in a next beam training occasion. For example, the second UE may receive one of the keep-alive request messages from the first UE that satisfies the keep-alive counter value, which may indicate that the link quality between the first UE and the second UE does not satisfy the threshold. The link quality may not satisfy the threshold when a data transmission rate associated with the link between the first UE and the second UE does not satisfy a threshold, a signal to noise ratio (SINR) associated with the link does not satisfy a threshold, an RSSI associated with the link does not satisfy a threshold, etc. The second UE may transmit, to the first UE, the keep-alive response message that indicates the link recovery based at least in part on receiving the keep-alive request message that satisfies the keep-alive counter value.

As shown by reference number 408, the first UE may perform a link recovery with the second UE based at least in part on the keep-alive counter value being reached. In some aspects, the first UE may perform the link recovery until the link between the first UE and the second UE is successfully recovered. In some aspects, the first UE may perform the link recovery until the keep-alive maximum counter value is reached.

In some aspects, the first UE may perform the link recovery by transmitting beam training reference signals (BT-RSs) until the second UE is rediscovered, and/or until the keep-alive maximum counter value is reached. The first UE may transmit the BT-RSs based at least in part on an RRC configuration associated with the link between the first UE and the second UE.

In some aspects, the first UE may perform the link recovery based at least in part on a first value divided by a second value in relation to a threshold. The first value may represent a quantity of keep-alive request messages being transmitted without receiving corresponding keep-alive response messages from the second UE, and the second value may represent a total quantity of keep-alive request messages transmitted to the second UE.

In some aspects, the second UE may perform the link recovery based at least in part on monitoring a channel for BT-RSs from the second UE. In some aspects, the second UE may perform the link recovery based at least in part on monitoring a channel for BT-RSs until the keep-alive maximum counter value is reached. The second UE may monitor the channel based at least in part on an RRC configuration associated with the link between the first UE and the second UE.

In some aspects, for FR2, the first UE may perform a link recovery procedure. The link recovery procedure may be triggered by the keep-alive mechanism, and the link recovery procedure may occur before local context information is released at the first UE. For example, the first UE may release the local context information based at least in part on the keep-alive counter value reaching $N_{max,\ keep-alive}$. For FR2, $N_0 < N_{max, keep-alive}$, where the link recovery procedure may be triggered based at least in part on the keep-alive counter value being equal to No. In other words, $N_0$ may represent a keep-alive counter value, that when reached, may trigger the link recovery procedure, and $N_{max, keep-alive}$ may represent a keep-alive counter value, that when reached, may trigger the release of the local context information. During the link recovery procedure, the first UE may attempt a link recovery until the link between the first UE and the second UE is successfully recovered, or until the maximum keep-alive timer expires (e.g., the keep-alive counter value reaches $N_{max,\ keep-alive}$). The triggering of the link recovery procedure may involve notifying lower layers of the first UE, such as the RRC layer, to perform the link recovery procedure.

In some aspects, during the link recovery procedure, the first UE may transmit or listen for BT-RSs on system-wide resources for standalone FR2 UEs. The first UE may transmit or listen for the BT-RSs based at least in part on an RRC configuration of the link between the first UE and the second UE. The first UE may transmit or listen for the BT-RSs until the second UE is rediscovered, or until the keep-alive counter value reaches $N_{max,\ keep-alive}$, at which point the local context information may be released at the first UE.

In some aspects, the second UE may receive a keep-alive request message from the first UE. The second UE may receive the keep-alive request message with the keep-alive counter value being greater than or equal to No, which may indicate that link failure between the first UE and the second UE is possible. The second UE may transmit a keep-alive response message to the first UE. Further, the second UE may include an indication to perform beam search/training in a next beam training occasion. The keep-alive response message with the indication may or may not be reached at the first UE, depending on whether the link failure has occurred between the first UE and the second UE. However, irrespective of whether the keep-alive response message with the indication is received at the first UE, the first UE may perform the link recovery procedure based at least in part on the keep-alive counter value being greater than or equal to No.

As indicated above, FIG. 4 is provided merely as an example. Other examples may differ from what is described with regard to FIG. 4.

Figure 5A:
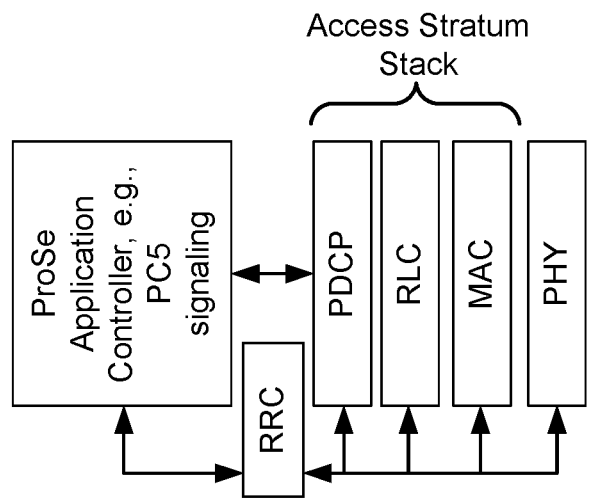
FIGS. 5A-5C are diagrams illustrating examples associated with UE protocol stacks that enable link recovery based at least in part on keep-alive messages, in accordance with the present disclosure.

FIG. 5A is a diagram illustrating an example 500 associated with a UE protocol stack that enables link recovery based at least in part on keep-alive messages, in accordance with the present disclosure.

A protocol stack of a sidelink UE may include a ProSe application controller, which may correspond to PC5 signaling, an RRC layer, a PDCP layer, an RLC layer, a MAC layer, and a PHY layer. The PDCP layer, the RLC layer, and the MAC layer may be included in an AS layer of the sidelink UE. In some aspects, the PC5 layer may trigger a keep-alive mechanism based at least in part on a pre-configured keep-alive timer. In some aspects, the PC5 layer may update keep-alive related timers and/or counter values based at least in part on an indication received from the RRC layer or the AS layer. In some aspects, based at least in part on received or generated measurement reports, the RRC layer may notify the PC5 layer to increase or decrease a frequency of PC5 keep-alive request message transmissions. In some aspects, the RRC layer may request the PC5 layer to trigger the keep-alive mechanism based at least in part on PHY measurements or measurement reports. In some aspects, the RRC layer may request the PC5 layer to trigger the keep-alive mechanism based at least in part on a quantity of HARQ retransmissions satisfying a threshold. In some aspects, the RRC layer may request the PC5 layer to trigger the keep-alive mechanism based at least in part on one or more RLC layer retransmissions.

As indicated above, FIG. 5A is provided merely as an example. Other examples may differ from what is described with regard to FIG. 5A.

Figure 5B:
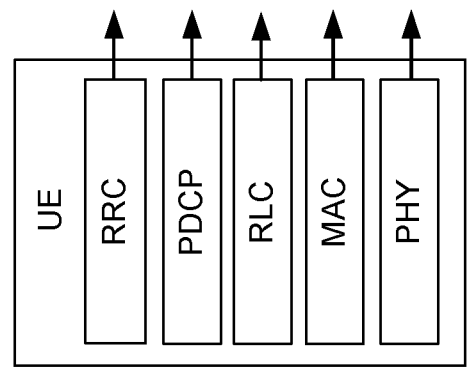

FIG. 5B is a diagram illustrating an example 510 associated with a UE protocol stack that enables link recovery based at least in part on keep-alive messages, in accordance with the present disclosure.

A protocol stack of a sidelink UE may include an RRC layer, a PDCP layer, an RLC layer, a MAC layer, and a PHY layer. In some aspects, one of the layers may trigger a keep-alive mechanism based at least in part on a pre-configured keep-alive timer.

As indicated above, FIG. 5B is provided merely as an example. Other examples may differ from what is described with regard to FIG. 5B.

Figure 5C:
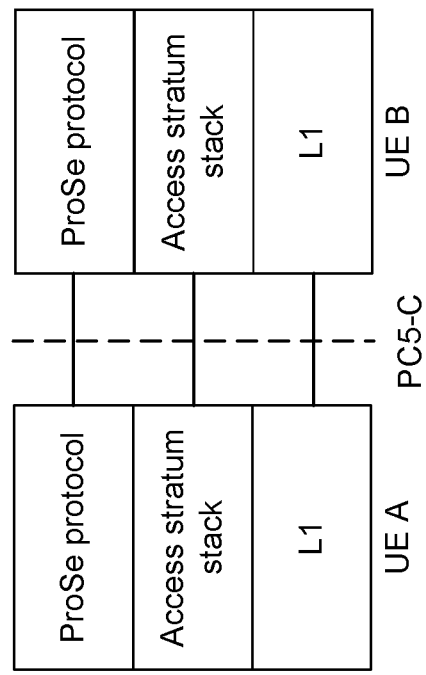

FIG. 5C is a diagram illustrating an example 520 associated with a UE protocol stack that enables link recovery based at least in part on keep-alive messages, in accordance with the present disclosure.

A first UE (UE A) may communicate with a second UE (UE B) via a proximity services (ProSe) protocol, an access stratum stack, and/or L1 signaling. Proximity service application signaling or control may include PC5 layer signaling. The first and second UEs may use the PC5 interface when in a same public land mobile network (PLMN) for the control of device-to-device (D2D) communication, which may include vehicle-to-everything (V2X) communication. Proximity service applications may also use PC6 and PC7 when roaming. The access stratum stack may include a PDCP layer, an RLC layer, and a MAC layer. In some aspects, the ProSe protocol may trigger a keep-alive mechanism based at least in part on a pre-configured keep-alive timer.

As indicated above, FIG. 5C is provided merely as an example. Other examples may differ from what is described with regard to FIG. 5C.

Figure 6:
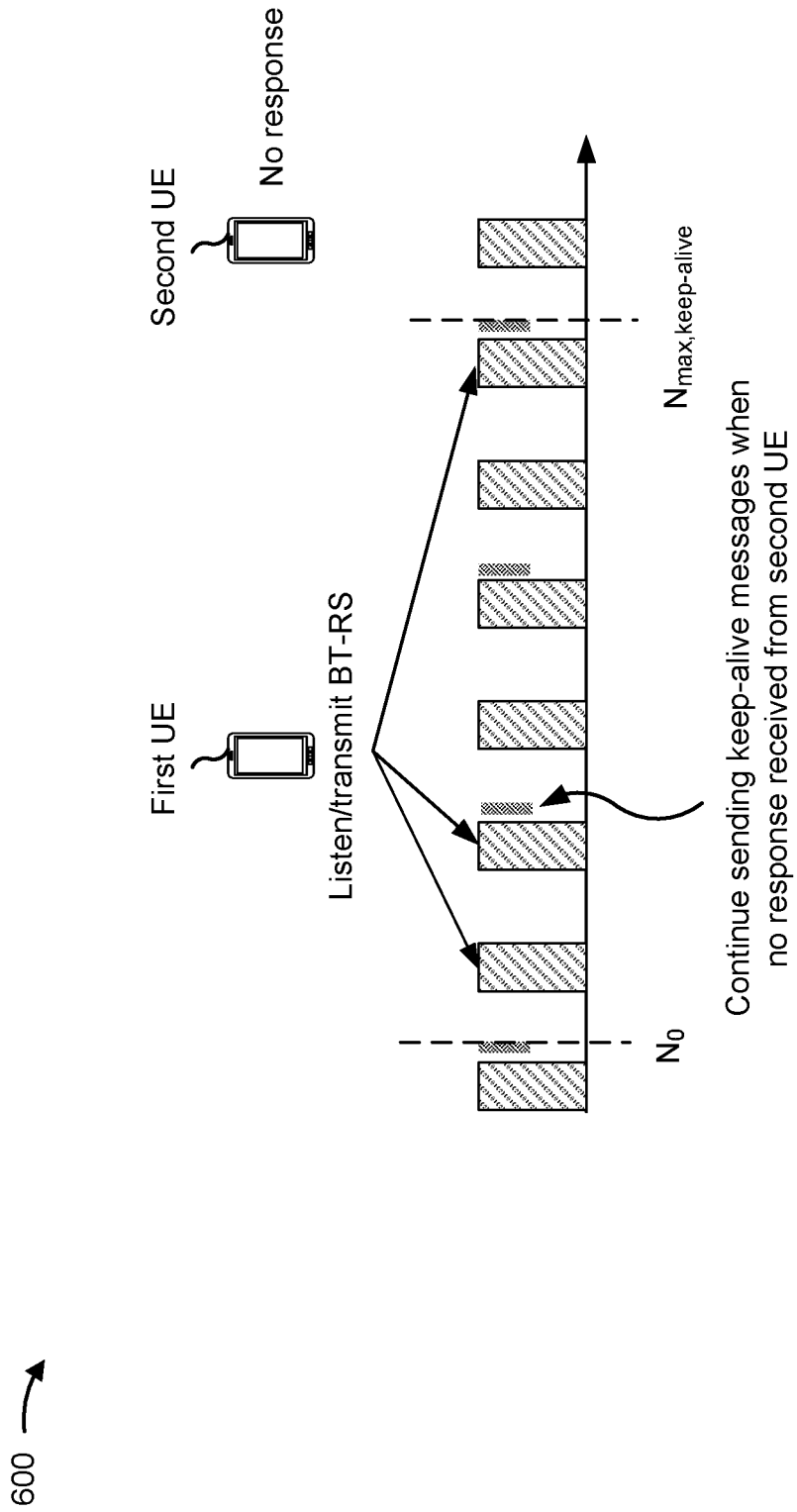
FIGS. 6-7 are diagrams illustrating examples associated with link recovery between sidelink UEs based at least in part on keep-alive messages, in accordance with the present disclosure.

FIG. 6 is a diagram illustrating an example 600 associated with link recovery between sidelink UEs based at least in part on keep-alive messages, in accordance with the present disclosure.

As shown in FIG. 6, a keep-alive counter value may exceed No, at which point a link recovery procedure may be triggered at a first UE. During the link recovery procedure (e.g., after the keep-alive counter value reaches No, and prior to the keep-alive counter value reaching $N_{max,\ keep-alive}$), the first UE may transmit BT-RSs to a second UE or listen for BT-RSs received from the second UE. The first UE may transmit or listen for the BT-RSs based at least in part on an RRC configuration of a link between the first UE and the second UE. The first UE may transmit or listen for the BT-RSs on system-wide resources. The first UE may continue transmitting keep-alive request messages to the second UE based at least in part on no keep-alive response messages being received from the second UE. After a quantity of keep-alive request messages are transmitted without receipt of corresponding keep-alive response messages, the keep-alive counter value may reach $N_{max,\ keep-alive}$, at which point the link recovery procedure may stop and local context information may be released at the first UE As indicated above, FIG. 6 is provided merely as an example. Other examples may differ from what is described with regard to FIG. 6.

Figure 7:
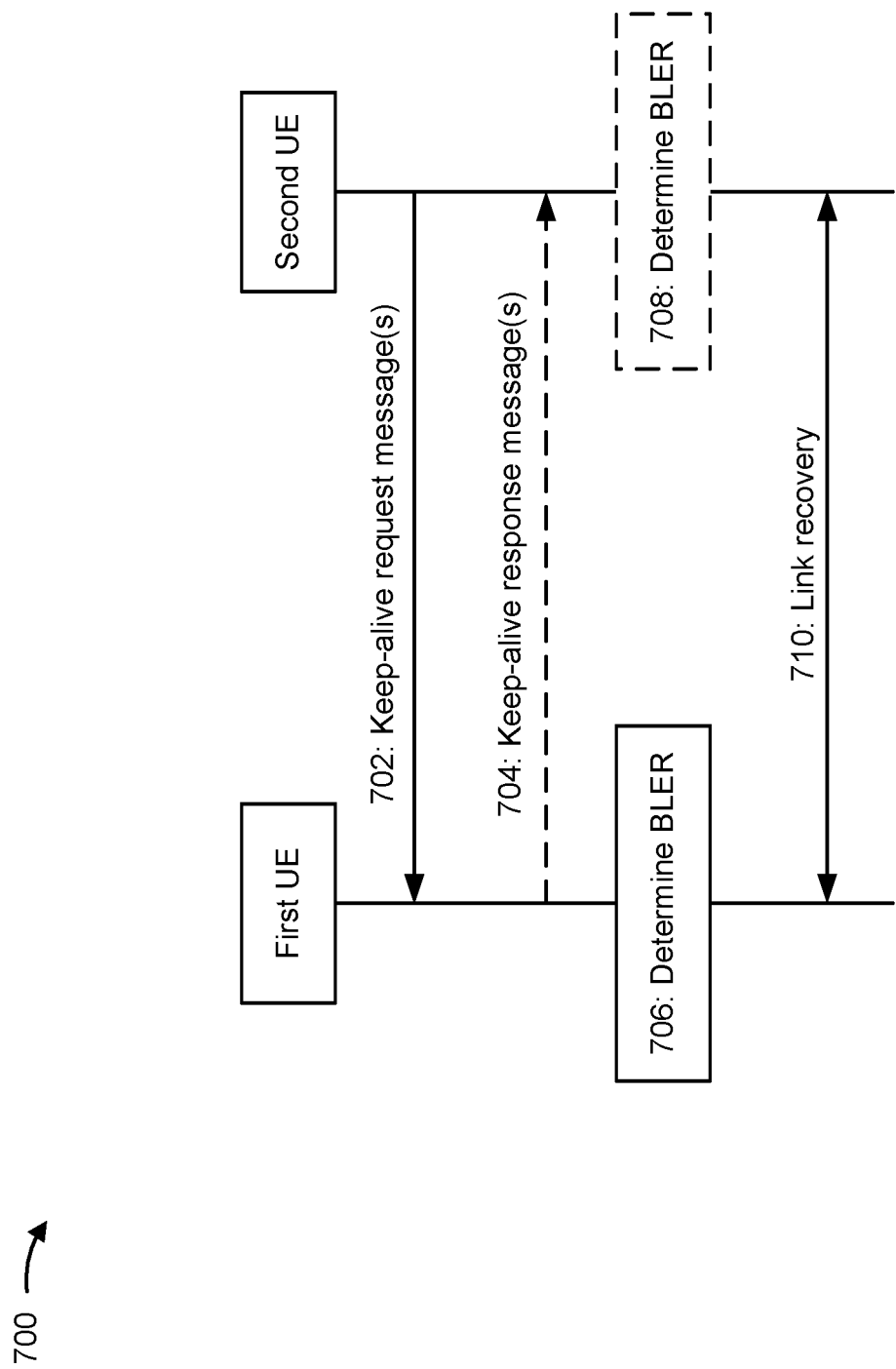

FIG. 7 is a diagram illustrating an example 700 associated with link recovery between sidelink UEs based at least in part on keep-alive messages, in accordance with the present disclosure. As shown in FIG. 7, example 700 includes communication between a first UE (e.g., UE 120*a*) and a second UE (e.g., UE 120*e*). In some aspects, the first UE and the second UE may be included in a wireless network such as wireless network 100. In some aspects, the first UE and the second UE may communicate over a sidelink.

As shown by reference number 702, the first UE may receive, from the second UE, keep-alive request messages. The first UE may be a transmitting (Tx) UE and/or a receiving (Rx) UE, and the second UE may be a Tx UE and/or an Rx UE. The keep-alive request messages may be received over a period of time via a sidelink interface between the first UE and the second UE. The period of time may be associated with a sliding window. The period of time may be configured to start from a last beam training or beam recovery process. In other words, the keep-alive request messages may be received over a window of time, where the window may be the sliding window or the window may start from the last beam training or beam recovery process.

As shown by reference number 704, the first UE may transmit keep-alive response messages to the second UE. The first UE may transmit the keep-alive response messages based at least in part on the keep-alive request messages received from the second UE.

As shown by reference number 706, the first UE may determine a BLER associated with the keep-alive request messages received over the period of time. In other words, the first UE may measure the BLER for the keep-alive request messages received over the window of time.

As shown by reference number 708, the second UE may determine the BLER for the keep-alive request messages over the period of time based at least in part on the keep-alive response messages received from the first UE. In other words, the second UE may determine the BLER based at least in part on the keep-alive request messages and/or corresponding keep-alive response messages.

As shown by reference number 710, the first UE and/or the second UE may perform a link recovery based at least in part on the BLER satisfying a threshold. In other words, a BLER threshold may be defined, and when the BLER over the time window satisfies the threshold, the link recovery may be triggered at the first UE and/or the second UE. In some aspects, the first UE may transmit, to the second UE, a subsequent keep-alive response message that indicates the link recovery. In some aspects, the link recovery may be performed irrespective of a keep-alive counter value of a current session between the first UE and the second UE.

As an example, the first UE may start a keep-alive procedure with the second UE, where keep-alive counter values of $N_0=5$ and $N_{max,\ keep-alive}=10$ may be configured for the keep-alive procedure. In a first keep-alive session, the second UE may receive a fourth keep-alive request message, and transmit a corresponding keep-alive response message to the first UE. In a subsequent keep-alive session, the second UE may receive a third keep-alive request message, and transmit a corresponding keep-alive response message to the first UE. In this example, a BLER is equal to $5/4+3=0.71$, which may not satisfy a BLER threshold, thereby indicating a weak link between the first UE and the second UE. The first UE and/or the second UE may initiate a link recovery procedure based at least in part on the BLER. An indication of the link recovery procedure may be included in a subsequent keep-alive request message or keep-alive response message. The link recovery procedure may be initiated irrespective of a keep-alive counter value of a current session between the first UE and the second UE.

As indicated above, FIG. 7 is provided merely as an example. Other examples may differ from what is described with regard to FIG. 7.

Figure 8:
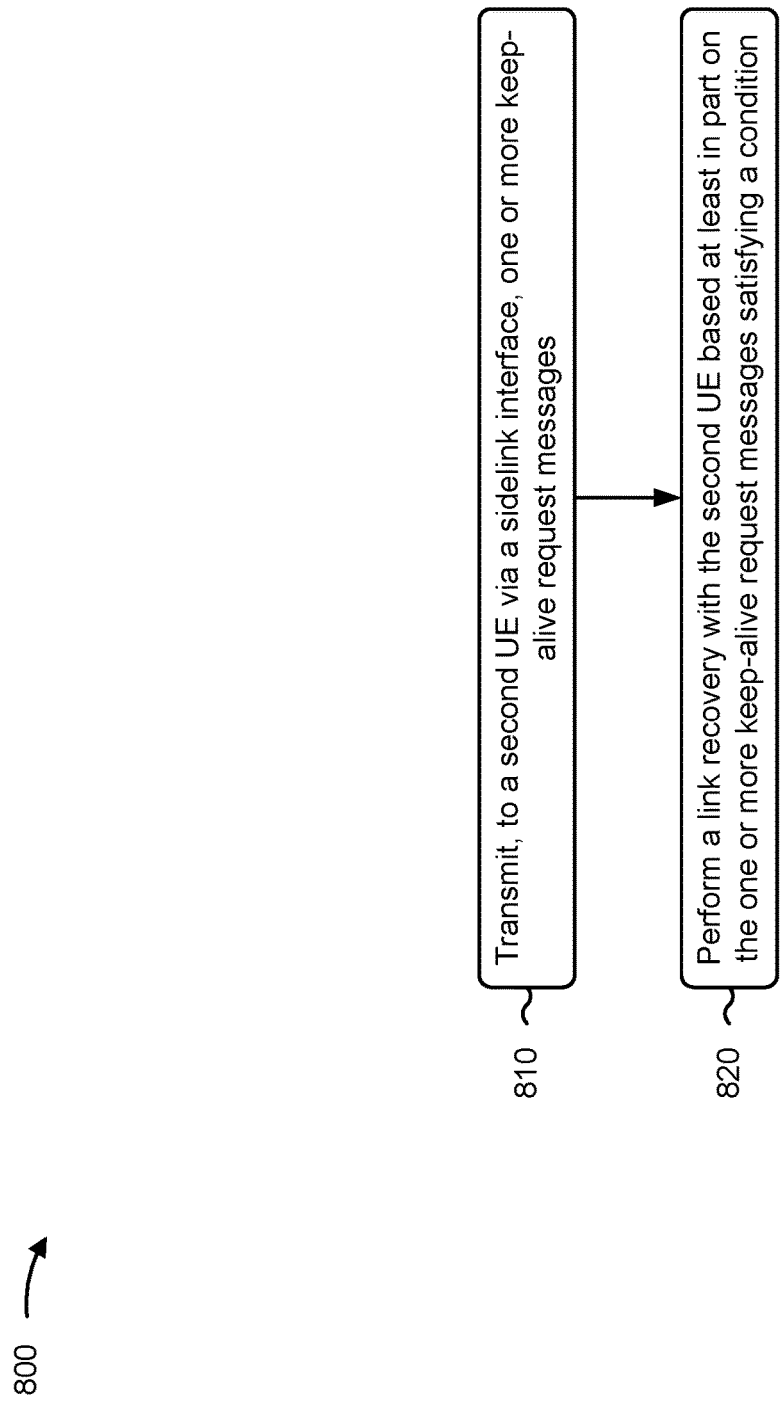
FIGS. 8-11 are diagrams illustrating example processes associated with link recovery between sidelink UEs based at least in part on keep-alive messages, in accordance with the present disclosure.

FIG. 8 is a diagram illustrating an example process 800 performed, for example, by a first UE, in accordance with the present disclosure. Example process 800 is an example where the first UE (e.g., UE 120*a*) performs operations associated with link recovery between sidelink UEs.

As shown in FIG. 8, in some aspects, process 800 may include transmitting, to a second UE (e.g., UE 120*e*) via a sidelink interface, one or more keep-alive request messages (block 810). For example, the first UE (e.g., using antenna 252, transmit processor 264, TX MIMO processor 266, modulator 254, controller/processor 280, and/or memory 282) may transmit, to a second UE via a sidelink interface, one or more keep-alive request messages, as described above.

As further shown in FIG. 8, in some aspects, process 800 may include performing a link recovery with the second UE based at least in part on the one or more keep-alive request messages satisfying a condition (block 820). For example, the first UE (e.g., using antenna 252, transmit processor 264, TX MIMO processor 266, modulator 254, controller/processor 280, and/or memory 282) may perform a link recovery with the second UE based at least in part on the one or more keep-alive request messages satisfying a condition, as described above.

Process 800 may include additional aspects, such as any single aspect or any combination of aspects described below and/or in connection with one or more other processes described elsewhere herein.

In a first aspect, transmitting the one or more keep-alive request messages is based at least in part on one or more keep-alive parameters being defined during a sidelink connection establishment or a sidelink connection update between the first UE and the second UE.

In a second aspect, alone or in combination with the first aspect, process 800 includes modifying one or more keep-alive parameters associated with the one or more keep-alive request messages to obtain one or more modified keep-alive parameters, and transmitting, to the second UE, an indication of the one or more modified keep-alive parameters.

In a third aspect, alone or in combination with one or more of the first and second aspects, modifying the one or more keep-alive parameters is based at least in part on one or more of measurement reports, or congestion measurements.

In a fourth aspect, alone or in combination with one or more of the first through third aspects, modifying the one or more keep-alive parameters comprises modifying the one or more keep-alive parameters to increase a frequency of the one or more keep-alive request messages based at least in part on a link quality between the first UE and the second UE not satisfying a threshold.

In a fifth aspect, alone or in combination with one or more of the first through fourth aspects, modifying the one or more keep-alive parameters comprises modifying the one or more keep-alive parameters to decrease a frequency of the one or more keep-alive request messages based at least in part on a link quality between the first UE and the second UE satisfying a threshold for a period of time.

In a sixth aspect, alone or in combination with one or more of the first through fifth aspects, transmitting the one or more keep-alive request messages is based at least in part on one or more measurement reports indicating that a link quality between the first UE and the second UE does not satisfy a threshold.

In a seventh aspect, alone or in combination with one or more of the first through sixth aspects, transmitting the one or more keep-alive request messages is based at least in part on one or more of: a quantity of hybrid automatic repeat request transmissions satisfying a threshold, or an indication of a radio link control layer retransmission.

In an eighth aspect, alone or in combination with one or more of the first through seventh aspects, transmitting the one or more keep-alive request messages comprises transmitting the one or more keep-alive request messages based at least in part on a keep-alive counter value that is less than a keep-alive maximum counter value that triggers a release of local context information at the first UE; and performing the link recovery comprises performing the link recovery with the second UE based at least in part on the keep-alive counter value being reached.

In a ninth aspect, alone or in combination with one or more of the first through eighth aspects, performing the link recovery comprises performing the link recovery until a link between the first UE and the second UE is successfully recovered, or performing the link recovery until the keep-alive maximum counter value is reached.

In a tenth aspect, alone or in combination with one or more of the first through ninth aspects, performing the link recovery comprises transmitting BT-RSs until the second UE is rediscovered, or transmitting BT-RSs until the keep-alive maximum counter value is reached, wherein the BT-RSs are transmitted based at least in part on a radio resource control configuration associated with a link between the first UE and the second UE.

In an eleventh aspect, alone or in combination with one or more of the first through tenth aspects, the keep-alive counter value is reached based at least in part on a quantity of keep-alive request messages being transmitted to the second UE without the first UE receiving corresponding keep-alive response messages from the second UE.

In a twelfth aspect, alone or in combination with one or more of the first through eleventh aspects, performing the link recovery is based at least in part on a first value that represents a quantity of keep-alive request messages being transmitted without receiving corresponding keep-alive response messages from the second UE, and a second value that represents a total quantity of keep-alive request messages transmitted to the second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
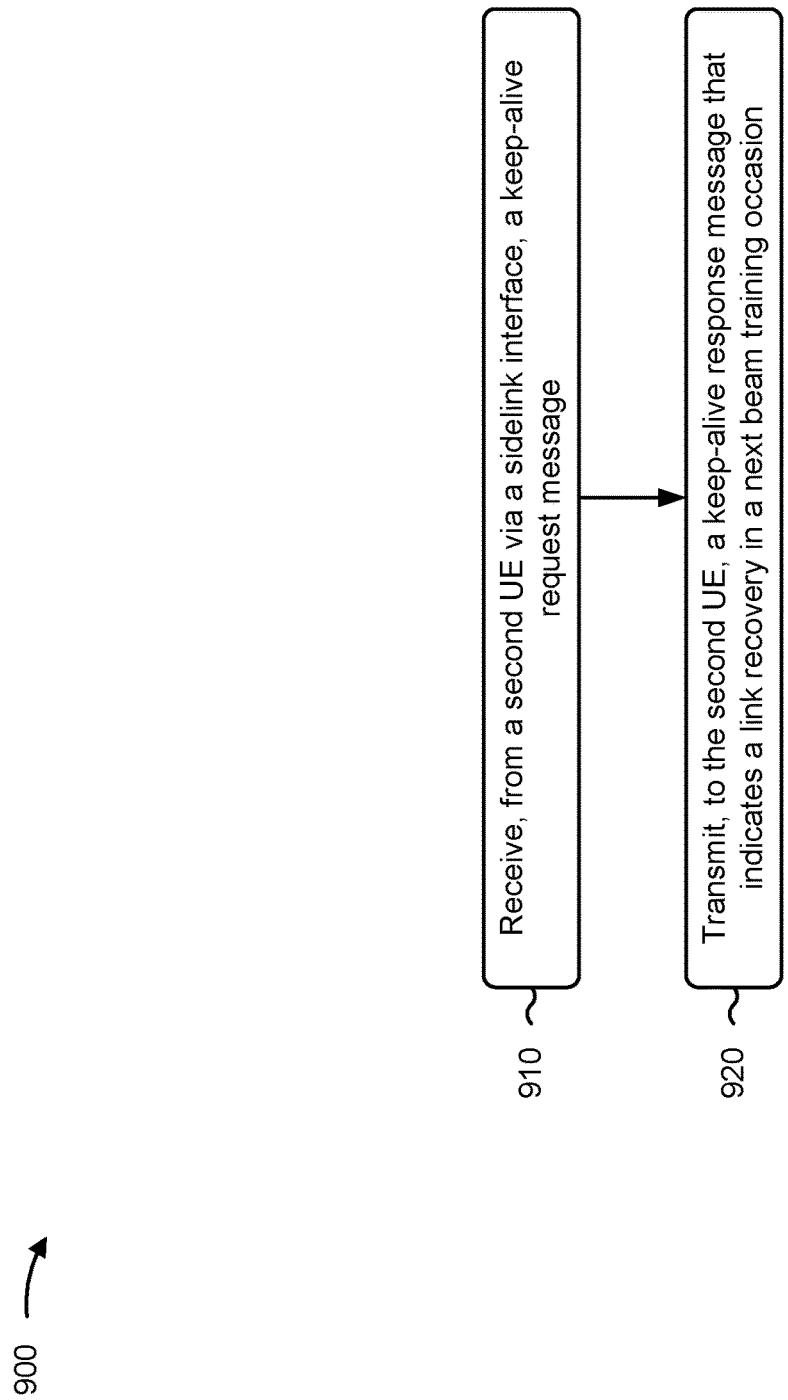

FIG. 9 is a diagram illustrating an example process 900 performed, for example, by a first UE, in accordance with the present disclosure. Example process 900 is an example where the first UE (e.g., UE 120e) performs operations associated with link recovery between sidelink UEs.

As shown in FIG. 9, in some aspects, process 900 may include receiving, from a second UE (e.g., UE 120a) via a sidelink interface, a keep-alive request message (block 910). For example, the first UE (e.g., using antenna 252, transmit processor 264, TX MIMO processor 266, modulator 254, controller/processor 280, and/or memory 282) may receive, from a second UE via a sidelink interface, a keep-alive request message, as described above.

As further shown in FIG. 9, in some aspects, process 900 may include transmitting, to the second UE, a keep-alive response message that indicates a link recovery in a next beam training occasion (block 920). For example, the first UE (e.g., using antenna 252, transmit processor 264, TX MIMO processor 266, modulator 254, controller/processor 280, and/or memory 282) may transmit, to the second UE, a keep-alive response message that indicates a link recovery in a next beam training occasion, as described above.

Process 900 may include additional aspects, such as any single aspect or any combination of aspects described below and/or in connection with one or more other processes described elsewhere herein.

In a first aspect, process 900 includes performing the link recovery based at least in part on monitoring a channel for beam training reference signals (BT-RSs) from the second UE.

In a second aspect, alone or in combination with the first aspect, process 900 includes performing the link recovery based at least in part on monitoring a channel for BT-RSs until the keep-alive maximum counter value is reached, wherein the channel is monitored for the BT-RSs based at least in part on a radio resource control configuration associated with a link between the first UE and the second UE.

In a third aspect, alone or in combination with one or more of the first and second aspects, the keep-alive request message is based at least in part on one or more keep-alive parameters being defined at the second UE, wherein the one or more keep-alive parameters include the keep-alive counter value.

In a fourth aspect, alone or in combination with one or more of the first through third aspects, the keep-alive request message is based at least in part on one or more modified keep-alive parameters, wherein the one or more modified keep-alive parameters are based at least in part on one or more of measurement reports, or congestion measurements.

In a fifth aspect, alone or in combination with one or more of the first through fourth aspects, the keep-alive request message is based at least in part on one or more measurement reports indicating that a link quality between the first UE and the second UE does not satisfy a threshold.

In a sixth aspect, alone or in combination with one or more of the first through fifth aspects, the keep-alive request message is based at least in part on a quantity of hybrid automatic repeat request transmissions satisfying a threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
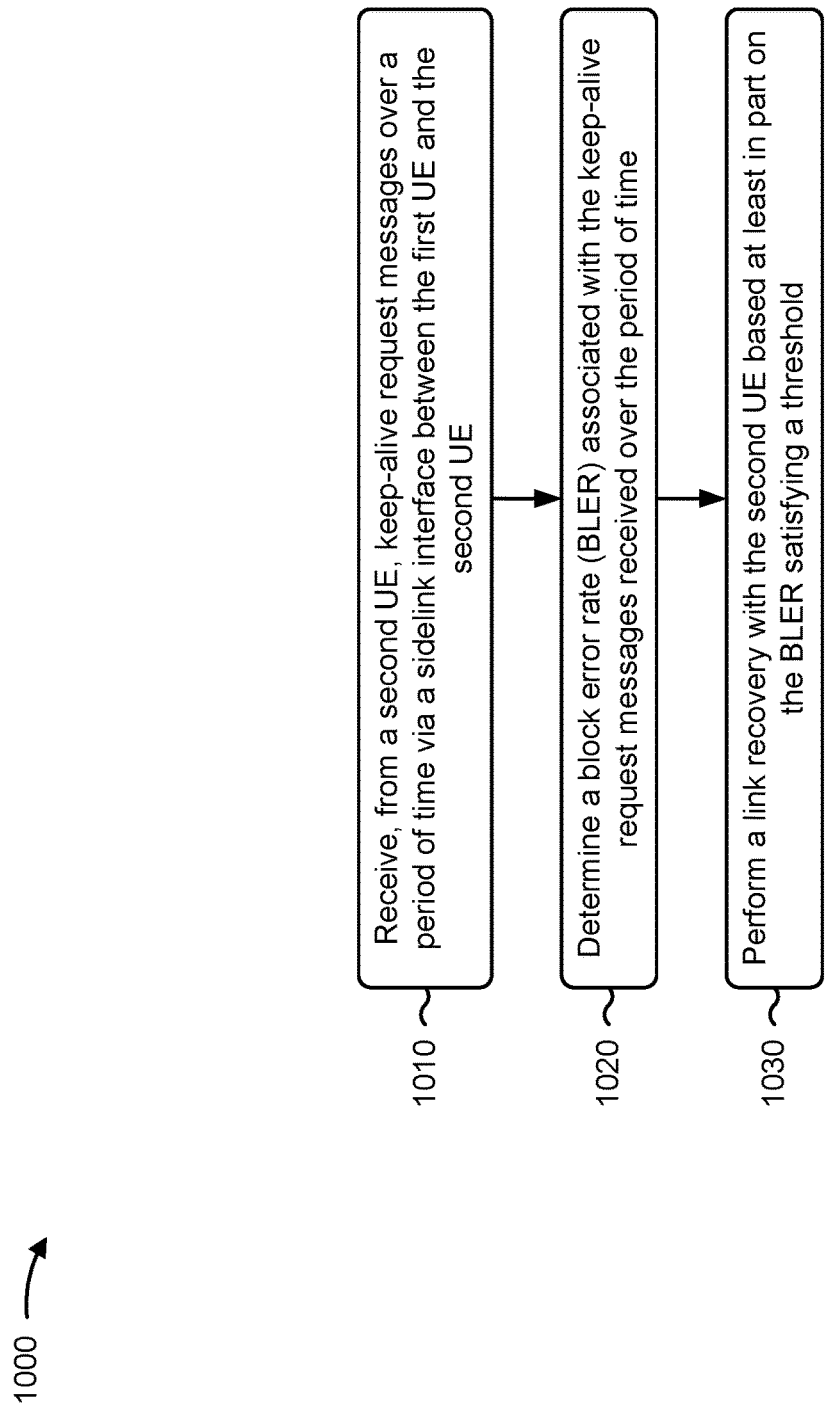

FIG. 10 is a diagram illustrating an example process 1000 performed, for example, by a first UE, in accordance with the present disclosure. Example process 1000 is an example where the first UE (e.g., UE 120a) performs operations associated with link recovery between sidelink UEs.

As shown in FIG. 10, in some aspects, process 1000 may include receiving, from a second UE (e.g., 120e), keep-alive request messages over a period of time via a sidelink interface between the first UE and the second UE (block 1010). For example, the first UE (e.g., using antenna 252, transmit processor 264, TX MIMO processor 266, modulator 254, controller/processor 280, and/or memory 282) may receive, from a second UE, keep-alive request messages over a period of time via a sidelink interface between the first UE and the second UE, as described above.

As further shown in FIG. 10, in some aspects, process 1000 may include determining a BLER associated with the keep-alive request messages received over the period of time (block 1020). For example, the first UE (e.g., using antenna 252, transmit processor 264, TX MIMO processor 266, modulator 254, controller/processor 280, and/or memory 282) may determine a BLER associated with the keep-alive request messages received over the period of time, as described above.

As further shown in FIG. 10, in some aspects, process 1000 may include performing a link recovery with the second UE based at least in part on the BLER satisfying a threshold (block 1030). For example, the first UE (e.g., using antenna 252, transmit processor 264, TX MIMO processor 266, modulator 254, controller/processor 280, and/or memory 282) may perform a link recovery with the second UE based at least in part on the BLER satisfying a threshold, as described above.

Process 1000 may include additional aspects, such as any single aspect or any combination of aspects described below and/or in connection with one or more other processes described elsewhere herein.

In a first aspect, the period of time is associated with a sliding window.

In a second aspect, alone or in combination with the first aspect, the period of time starts from a last beam training or beam recovery process.

In a third aspect, alone or in combination with one or more of the first and second aspects, performing the link recovery comprises transmitting, to the second UE, a keep-alive response message that indicates the link recovery.

In a fourth aspect, alone or in combination with one or more of the first through third aspects, performing the link recovery comprises performing the link recovery irrespective of a keep-alive counter value of a current session between the first UE and the second UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
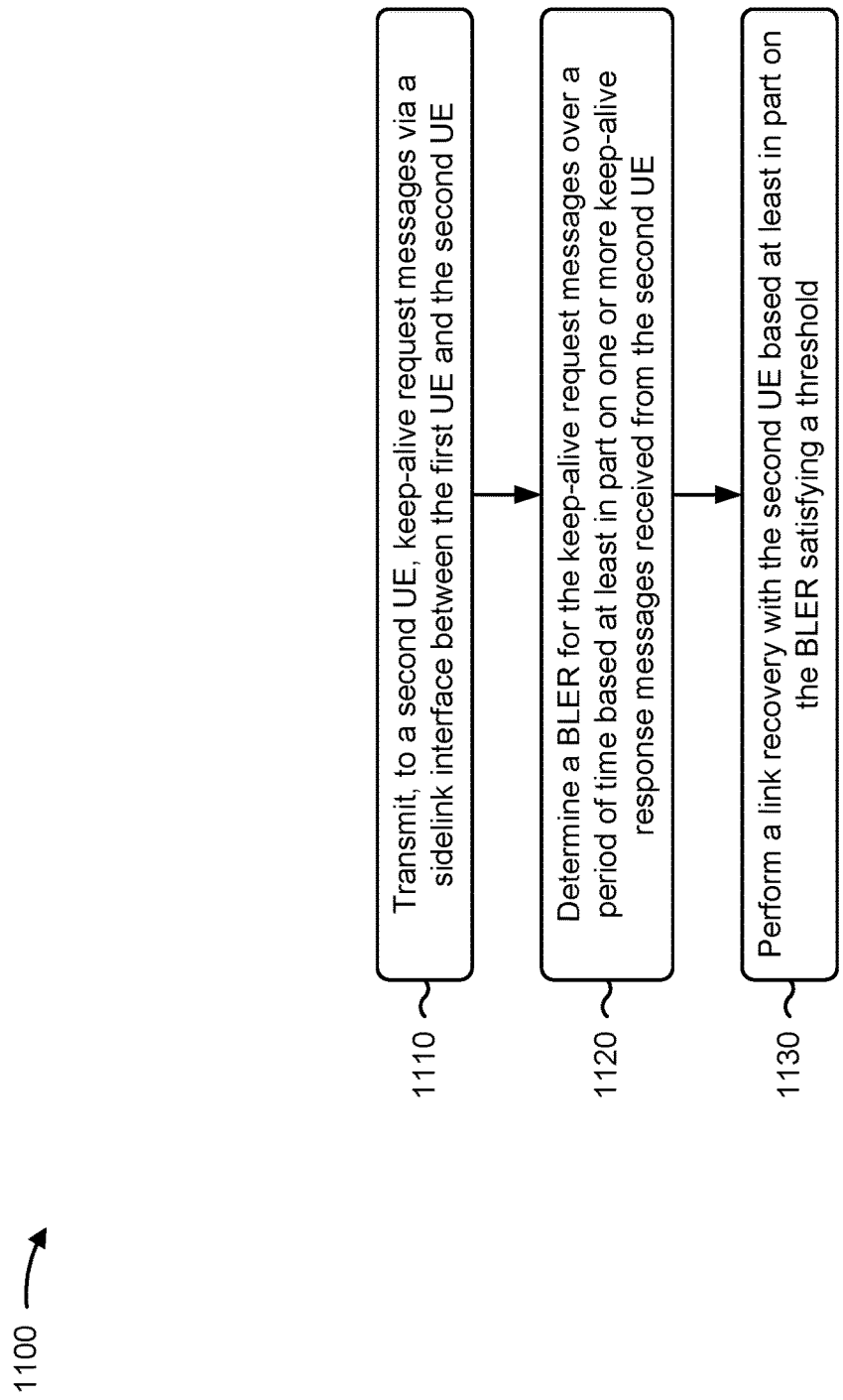

FIG. 11 is a diagram illustrating an example process 1100 performed, for example, by a first UE, in accordance with the present disclosure. Example process 1100 is an example where the first UE (e.g., UE 120*e*) performs operations associated with link recovery between sidelink UEs.

As shown in FIG. 11, in some aspects, process 1100 may include transmitting, to a second UE (e.g., UE 120*a*), keep-alive request messages via a sidelink interface between the first UE and the second UE (block 1110). For example, the UE (e.g., using transmission component 1206, depicted in FIG. 12) may transmit, to a second UE, keep-alive request messages via a sidelink interface between the first UE and the second UE, as described above.

As further shown in FIG. 11, in some aspects, process 1100 may include determining a BLER for the keep-alive request messages over a period of time based at least in part on one or more keep-alive response messages received from the second UE (block 1120). For example, the first UE (e.g., using determination component 1212, depicted in FIG. 12) may determine a BLER for the keep-alive request messages over a period of time based at least in part on one or more keep-alive response messages received from the second UE, as described above.

As further shown in FIG. 11, in some aspects, process 1100 may include performing a link recovery with the second UE based at least in part on the BLER satisfying a threshold (block 1130). For example, the first UE (e.g., using performance component 1210, depicted in FIG. 12) may perform a link recovery with the second UE based at least in part on the BLER satisfying a threshold, as described above.

Process 1100 may include additional aspects, such as any single aspect or any combination of aspects described below and/or in connection with one or more other processes described elsewhere herein.

In a first aspect, the period of time is associated with a sliding window.

In a second aspect, alone or in combination with the first aspect, the period of time starts from a last beam training or beam recovery process.

In a third aspect, alone or in combination with one or more of the first and second aspects, performing the link recovery comprises transmitting, to the second UE, a keep-alive request message that indicates the link recovery.

In a fourth aspect, alone or in combination with one or more of the first through third aspects, performing the link recovery comprises performing the link recovery irrespective of a keep-alive counter value of a current session between the first UE and the second UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
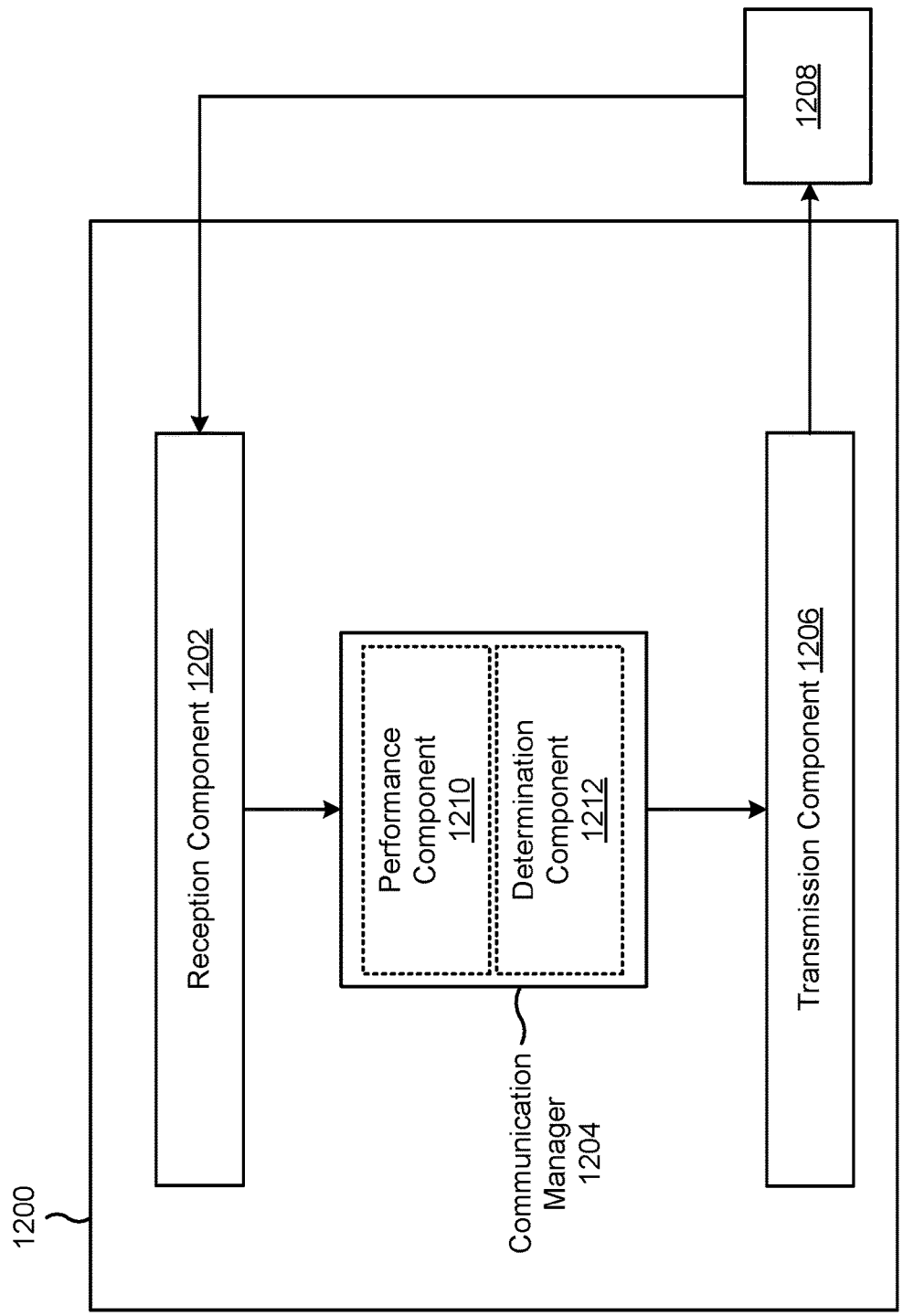
FIG. 12 is a block diagram of an example apparatus for wireless communication, in accordance with the present disclosure.

FIG. 12 is a block diagram of an example apparatus 1200 for wireless communication in accordance with the present disclosure. The apparatus 1200 may be a first UE, or a first UE may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 4-7. Additionally or alternatively, the apparatus 1200 may be configured to perform one or more processes described herein, such as process 800 of FIG. 8, process 900 of FIG. 9, process 1000 of FIG. 10, process 1100 of FIG. 11, or a combination thereof. In some aspects, the apparatus 1200 may include one or more components of the first UE described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the first UE described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the first UE described above in connection with FIG. 2. In some aspects, the transmission component 1206 may be co-located with the reception component 1202 in a transceiver.

The communication manager 1204 may transmit or may cause the transmission component 1206 to transmit, to a second UE via a sidelink interface, one or more keep-alive request messages. The communication manager 1204 may perform a link recovery with the second UE based at least in part on the one or more keep-alive request messages satisfying a condition. In some aspects, the communication manager 1204 may perform one or more operations described elsewhere herein as being performed by one or more components of the communication manager 1204.

The communication manager 1204 may receive or may cause the reception component 1202 to receive, from a second UE via a sidelink interface, a keep-alive request message. The communication manager 1204 may transmit or may cause the transmission component 1206 to transmit, to the second UE, a keep-alive response message that indicates a link recovery in a next beam training occasion. In some aspects, the communication manager 1204 may perform one or more operations described elsewhere herein as being performed by one or more components of the communication manager 1204.

The communication manager 1204 may receive or may cause the reception component 1202 to receive, from a second UE, keep-alive request messages over a period of time via a sidelink interface between the first UE and the second UE. The communication manager 1204 may determine a BLER associated with the keep-alive request messages received over the period of time. The communication manager 1204 may perform a link recovery with the second UE based at least in part on the BLER satisfying a threshold. In some aspects, the communication manager 1204 may perform one or more operations described elsewhere herein as being performed by one or more components of the communication manager 1204.

The communication manager 1204 may transmit or may cause the transmission component 1206 to transmit, to a second UE, keep-alive request messages via a sidelink interface between the first UE and the second UE. The communication manager 1204 may determine a BLER for the keep-alive request messages over a period of time based at least in part on one or more keep-alive response messages received from the second UE. The communication manager 1204 may perform a link recovery with the second UE based at least in part on the BLER satisfying a threshold. In some aspects, the communication manager 1204 may perform one or more operations described elsewhere herein as being performed by one or more components of the communication manager 1204.

The communication manager 1204 may include a controller/processor, a memory, or a combination thereof, of the first UE described above in connection with FIG. 2. In some aspects, the communication manager 1204 includes a set of components, such as a performance component 1210, a determination component 1212, or a combination thereof. Alternatively, the set of components may be separate and distinct from the communication manager 1204. In some aspects, one or more components of the set of components may include or may be implemented within a controller/processor, a memory, or a combination thereof, of the first UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
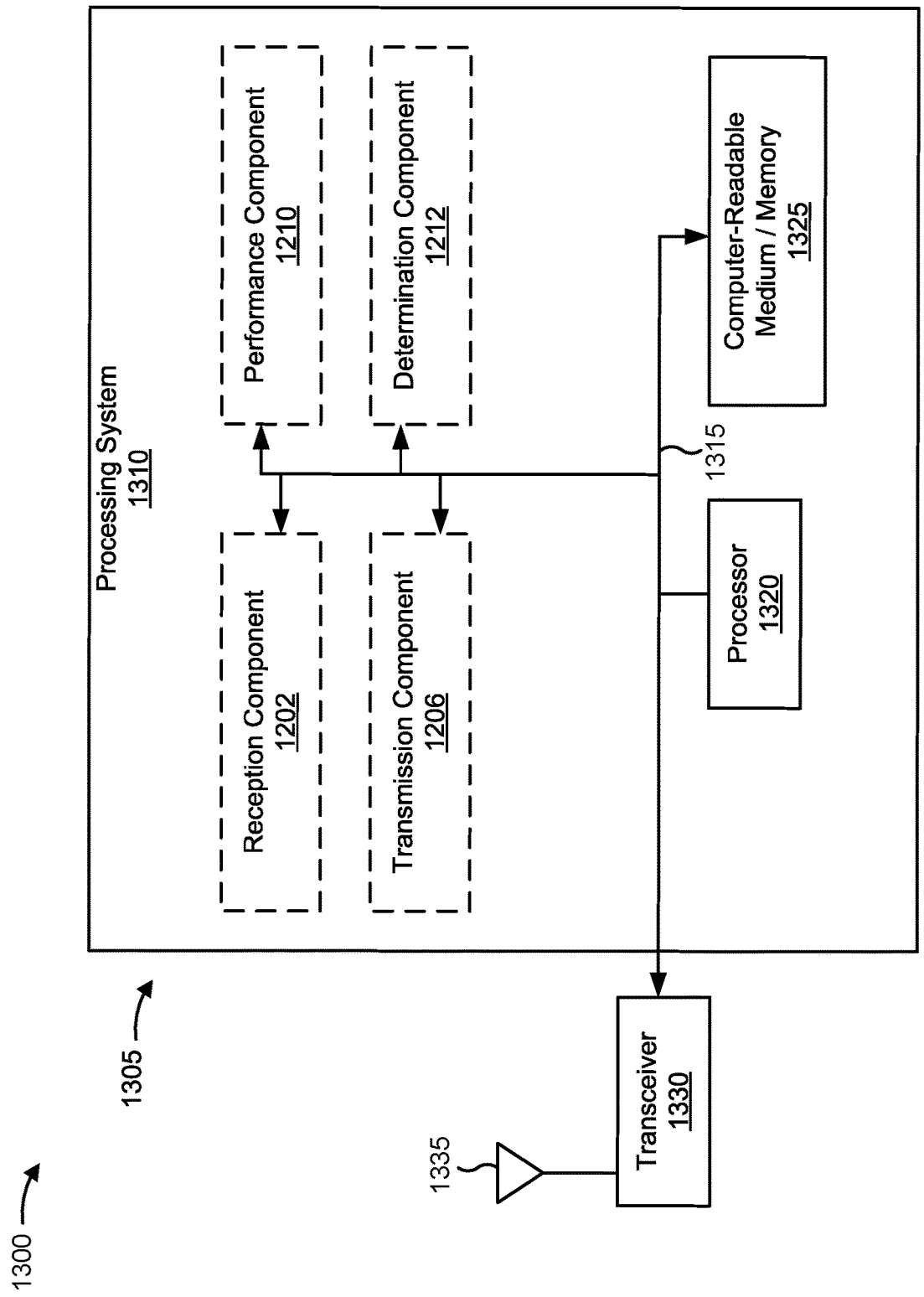
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310. The apparatus 1305 may be a first UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1206, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280.

In some aspects, the apparatus 1305 for wireless communication includes means for transmitting, to a second UE via a sidelink interface, one or more keep-alive request messages. The apparatus 1305 for wireless communication includes means for performing a link recovery with the second UE based at least in part on the one or more keep-alive request messages satisfying a condition.

In some aspects, the apparatus 1305 for wireless communication includes means for receiving, from a second UE via a sidelink interface, a keep-alive request message, the apparatus 1305 for wireless communication includes means for transmitting, to the second UE, a keep-alive response message that indicates a link recovery in a next beam training occasion.

In some aspects, the apparatus 1305 for wireless communication includes means for receiving, from a second UE, keep-alive request messages over a period of time via a sidelink interface between the first UE and the second UE. In some aspects, the apparatus 1305 for wireless communication includes means for determining a BLER associated with the keep-alive request messages received over the period of time. In some aspects, the apparatus 1305 for wireless communication includes means for performing a link recovery with the second UE based at least in part on the BLER satisfying a threshold.

In some aspects, the apparatus 1305 for wireless communication includes means for transmitting, to a second UE, keep-alive request messages via a sidelink interface between the first UE and the second UE. In some aspects, the apparatus 1305 for wireless communication includes means for determining a BLER for the keep-alive request messages over a period of time based at least in part on one or more keep-alive response messages received from the second UE. In some aspects, the apparatus 1305 for wireless communication includes means for performing a link recovery with the second UE based at least in part on the BLER satisfying a threshold.

The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
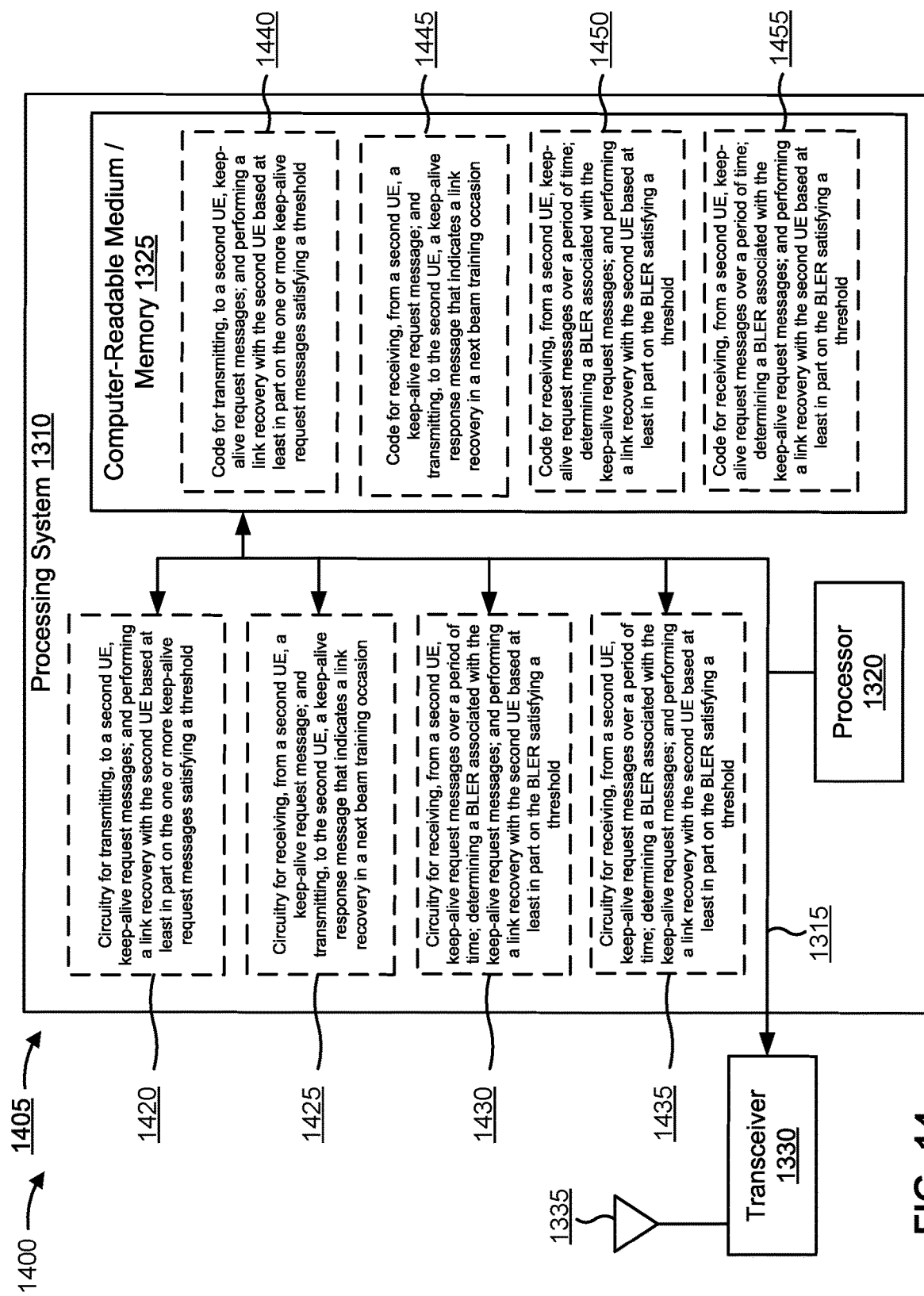
FIG. 14 is a diagram illustrating an example of an implementation of code and circuitry for an apparatus, in accordance with the present disclosure.

FIG. 14 is a diagram illustrating an example 1400 of an implementation of code and circuitry for an apparatus 1405. The apparatus 1405 may be a first UE.

As further shown in FIG. 14, the apparatus may include circuitry for transmitting, to a second UE via a sidelink interface, one or more keep-alive request messages; and performing a link recovery with the second UE based at least in part on the one or more keep-alive request messages satisfying a condition (circuitry 1420). For example, the apparatus may include circuitry to enable the apparatus to transmit, to a second UE via a sidelink interface, one or more keep-alive request messages; and perform a link recovery with the second UE based at least in part on the one or more keep-alive request messages satisfying a condition.

As further shown in FIG. 14, the apparatus may include circuitry for receiving, from a second UE via a sidelink interface, a keep-alive request message; and transmitting, to the second UE, a keep-alive response message that indicates a link recovery in a next beam training occasion (circuitry 1425). For example, the apparatus may include circuitry to enable the apparatus to receive, from a second UE via a sidelink interface, a keep-alive request message; and transmit, to the second UE, a keep-alive response message that indicates a link recovery in a next beam training occasion.

As further shown in FIG. 14, the apparatus may include circuitry for receiving, from a second UE, keep-alive request messages over a period of time via a sidelink interface between the first UE and the second UE; determining a BLER associated with the keep-alive request messages received over the period of time; and performing a link recovery with the second UE based at least in part on the BLER satisfying a threshold (circuitry 1430). For example, the apparatus may include circuitry to enable the apparatus to receive, from a second UE, keep-alive request messages over a period of time via a sidelink interface between the first UE and the second UE; determine a BLER associated with the keep-alive request messages received over the period of time; and perform a link recovery with the second UE based at least in part on the BLER satisfying a threshold.

As further shown in FIG. 14, the apparatus may include circuitry for transmitting, to a second UE, keep-alive request messages via a sidelink interface between the first UE and the second UE; determining a BLER for the keep-alive request messages over a period of time based at least in part on one or more keep-alive response messages received from the second UE; and performing a link recovery with the second UE based at least in part on the BLER satisfying a threshold (circuitry 1435). For example, the apparatus may include circuitry to enable the apparatus to transmit, to a second UE, keep-alive request messages via a sidelink interface between the first UE and the second UE; determine a BLER for the keep-alive request messages over a period of time based at least in part on one or more keep-alive response messages received from the second UE; and perform a link recovery with the second UE based at least in part on the BLER satisfying a threshold.

As further shown in FIG. 14, the apparatus may include, stored in computer-readable medium 1325, code for transmitting, to a second UE via a sidelink interface, one or more keep-alive request messages; and performing a link recovery with the second UE based at least in part on the (code 1440). For example, the apparatus may include code that, when executed by the processor 1320, may cause the transceiver 1330 to transmit, to a second UE via a sidelink interface, one or more keep-alive request messages; and may cause the processor 1320 to perform a link recovery with the second UE based at least in part on the one or more keep-alive request messages satisfying a condition.

As further shown in FIG. 14, the apparatus may include, stored in computer-readable medium 1325, code for receiving, from a second UE via a sidelink interface, a keep-alive request message; and transmitting, to the second UE, a keep-alive response message that indicates a link recovery in a next beam training occasion (code 1445). For example, the apparatus may include code that, when executed by the processor 1320, may cause the transceiver 1330 to receive, from a second UE via a sidelink interface, a keep-alive request message; and transmit, to the second UE, a keep-alive response message that indicates a link recovery in a next beam training occasion.

As further shown in FIG. 14, the apparatus may include, stored in computer-readable medium 1325, code for receiving, from a second UE, keep-alive request messages over a period of time via a sidelink interface between the first UE and the second UE; determining a BLER associated with the keep-alive request messages received over the period of time; and performing a link recovery with the second UE based at least in part on the BLER satisfying a threshold (code 1450). For example, the apparatus may include code that, when executed by the processor 1320, may cause the transceiver 1330 to receive, from a second UE, keep-alive request messages over a period of time via a sidelink interface between the first UE and the second UE; any may cause the processor 1320 to determine a BLER associated with the keep-alive request messages received over the period of time; and perform a link recovery with the second UE based at least in part on the BLER satisfying a threshold.

As further shown in FIG. 14, the apparatus may include, stored in computer-readable medium 1325, code for transmitting, to a second UE, keep-alive request messages via a sidelink interface between the first UE and the second UE; determining a BLER for the keep-alive request messages over a period of time based at least in part on one or more keep-alive response messages received from the second UE; and performing a link recovery with the second UE based at least in part on the BLER satisfying a threshold (code 1455). For example, the apparatus may include code that, when executed by the processor 1320, may cause the transceiver 1330 to transmit, to a second UE, keep-alive request messages via a sidelink interface between the first UE and the second UE; any may cause the processor 1320 to determine a BLER for the keep-alive request messages over a period of time based at least in part on one or more keep-alive response messages received from the second UE; and perform a link recovery with the second UE based at least in part on the BLER satisfying a threshold.

FIG. 14 is provided as an example. Other examples may differ from what is described in connection with FIG. 14.

The following provides an overview of some Aspects of the present disclosure:

Aspect 1: A method of wireless communication performed by a first user equipment (UE), comprising: transmitting, to a second UE via a sidelink interface, one or more keep-alive request messages; and performing a link recovery with the second UE based at least in part on the one or more keep-alive request messages satisfying a condition.

Aspect 2: The method of Aspect 1, wherein transmitting the one or more keep-alive request messages is based at least in part on one or more keep-alive parameters being defined during a sidelink connection establishment or a sidelink connection update between the first UE and the second UE.

Aspect 3: The method of any of Aspects 1 through 2, further comprising: modifying one or more keep-alive parameters associated with the one or more keep-alive request messages to obtain one or more modified keep-alive parameters; and transmitting, to the second UE, an indication of the one or more modified keep-alive parameters.

Aspect 4: The method of Aspect 3, wherein modifying the one or more keep-alive parameters is based at least in part on one or more of: measurement reports, or congestion measurements.

Aspect 5: The method of Aspect 3, wherein modifying the one or more keep-alive parameters comprises: modifying the one or more keep-alive parameters to increase a frequency of the one or more keep-alive request messages based at least in part on a link quality between the first UE and the second UE not satisfying a threshold.

Aspect 6: The method of Aspect 3, wherein modifying the one or more keep-alive parameters comprises: modifying the one or more keep-alive parameters to decrease a frequency of the one or more keep-alive request messages based at least in part on a link quality between the first UE and the second UE satisfying a threshold for a period of time.

Aspect 7: The method of any of Aspects 1 through 6, wherein transmitting the one or more keep-alive request messages is based at least in part on one or more measurement reports indicating that a link quality between the first UE and the second UE does not satisfy a threshold.

Aspect 8: The method of any of Aspects 1 through 7, wherein transmitting the one or more keep-alive request messages is based at least in part on a quantity of hybrid automatic repeat request transmissions satisfying a threshold, or an indication of a radio link control layer retransmission.

Aspect 9: The method of any of Aspects 1 through 8, wherein transmitting the one or more keep-alive request messages comprises transmitting the one or more keep-alive request messages based at least in part on a keep-alive counter value that is less than a keep-alive maximum counter value that triggers a release of local context information at the first UE; and performing the link recovery comprises performing the link recovery with the second UE based at least in part on the condition of reaching the keep-alive counter value being satisfied.

Aspect 10: The method of Aspect 9, wherein performing the link recovery comprises: performing the link recovery until a link between the first UE and the second UE is successfully recovered; or performing the link recovery until the keep-alive maximum counter value is reached.

Aspect 11: The method of Aspect 9, wherein performing the link recovery comprises: transmitting beam training reference signals (BT-RSs) until the second UE is rediscovered; or transmitting BT-RSs until the keep-alive maximum counter value is reached, wherein the BT-RSs are transmitted based at least in part on a radio resource control configuration associated with a link between the first UE and the second UE.

Aspect 12: The method of Aspect 9, wherein the keep-alive counter value is reached based at least in part on a quantity of keep-alive request messages being transmitted to the second UE without the first UE receiving corresponding keep-alive response messages from the second UE.

Aspect 13: The method of any of Aspects 1 through 12, wherein performing the link recovery is based at least in part on a first value that represents a quantity of keep-alive request messages being transmitted without receiving corresponding keep-alive response messages from the second UE, and a second value that represents a total quantity of keep-alive request messages transmitted to the second UE.

Aspect 14: A method of wireless communication performed by a first user equipment (UE), comprising: receiving, from a second UE via a sidelink interface, a keep-alive request message; and transmitting, to the second UE, a keep-alive response message that indicates a link recovery in a next beam training occasion.

Aspect 15: The method of Aspect 14, further comprising performing the link recovery based at least in part on monitoring a channel for beam training reference signals (BT-RSs) from the second UE.

Aspect 16: The method of any of Aspects 14 through 15, further comprising performing the link recovery based at least in part on monitoring a channel for beam training reference signals (BT-RSs) until the keep-alive maximum counter value is reached, wherein the channel is monitored for the BT-RSs based at least in part on a radio resource control configuration associated with a link between the first UE and the second UE.

Aspect 17: The method of any of Aspects 14 through 16, wherein the keep-alive request message is based at least in part on one or more keep-alive parameters being defined at the second UE, wherein the one or more keep-alive parameters include the keep-alive counter value.

Aspect 18: The method of any of Aspects 14 through 17, wherein the keep-alive request message is based at least in part on one or more modified keep-alive parameters, wherein the one or more modified keep-alive parameters are based at least in part on one or more of: measurement reports, or congestion measurements.

Aspect 19: The method of any of Aspects 14 through 18, wherein the keep-alive request message is based at least in part on one or more measurement reports indicating that a link quality between the first UE and the second UE does not satisfy a threshold.

Aspect 20: The method of any of Aspects 14 through 19, wherein the keep-alive request message is based at least in part on a quantity of hybrid automatic repeat request transmissions satisfying a threshold.

Aspect 21: A method of wireless communication performed by a first user equipment (UE), comprising: receiving, from a second UE, keep-alive request messages over a period of time via a sidelink interface between the first UE and the second UE; determining a block error rate (BLER) associated with the keep-alive request messages received over the period of time; and performing a link recovery with the second UE based at least in part on the BLER satisfying a threshold.

Aspect 22: The method of Aspect 21, wherein the period of time is associated with a sliding window.

Aspect 23: The method of any of Aspects 21 through 22, wherein the period of time starts from a last beam training or beam recovery process.

Aspect 24: The method of any of Aspects 21 through 23, wherein performing the link recovery comprises transmitting, to the second UE, a keep-alive response message that indicates the link recovery.

Aspect 25: The method of any of Aspects 21 through 24, wherein performing the link recovery comprises performing the link recovery irrespective of a keep-alive counter value of a current session between the first UE and the second UE.

Aspect 26: A method of wireless communication performed by a first user equipment (UE), comprising: transmitting, to a second UE, keep-alive request messages via a sidelink interface between the first UE and the second UE; determining a block error rate (BLER) for the keep-alive request messages over a period of time based at least in part on one or more keep-alive response messages received from the second UE; and performing a link recovery with the second UE based at least in part on the BLER satisfying a threshold.

Aspect 27: The method of Aspect 26, wherein the period of time is associated with a sliding window.

Aspect 28: The method of any of Aspects 26 through 27, wherein the period of time starts from a last beam training or beam recovery process.

Aspect 29: The method of any of Aspects 26 through 28, wherein performing the link recovery comprises transmitting, to the second UE, a keep-alive request message that indicates the link recovery.

Aspect 30: The method of any of Aspects 26 through 29, wherein performing the link recovery comprises performing the link recovery irrespective of a keep-alive counter value of a current session between the first UE and the second UE.

Aspect 31: An apparatus for wireless communication at a device, comprising a processor; memory coupled with the processor; and instructions stored in the memory and executable by the processor to cause the apparatus to perform the method of one or more Aspects of Aspects 1-13.

Aspect 32: A device for wireless communication, comprising a memory and one or more processors coupled to the memory, the memory and the one or more processors configured to perform the method of one or more Aspects of Aspects 1-13.

Aspect 33: An apparatus for wireless communication, comprising at least one means for performing the method of one or more Aspects of Aspects 1-13.

Aspect 34: A non-transitory computer-readable medium storing code for wireless communication, the code comprising instructions executable by a processor to perform the method of one or more Aspects of Aspects 1-13.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 36: An apparatus for wireless communication at a device, comprising a processor; memory coupled with the processor; and instructions stored in the memory and executable by the processor to cause the apparatus to perform the method of one or more Aspects of Aspects 14-20.

Aspect 37: A device for wireless communication, comprising a memory and one or more processors coupled to the memory, the memory and the one or more processors configured to perform the method of one or more Aspects of Aspects 14-20.

Aspect 38: An apparatus for wireless communication, comprising at least one means for performing the method of one or more Aspects of Aspects 14-20.

Aspect 39: A non-transitory computer-readable medium storing code for wireless communication, the code comprising instructions executable by a processor to perform the method of one or more Aspects of Aspects 14-20.

Aspect 40: A non-transitory computer-readable medium storing a set of instructions for wireless communication, the set of instructions comprising one or more instructions that, when executed by one or more processors of a device, cause the device to perform the method of one or more Aspects of Aspects 14-20.

Aspect 41: An apparatus for wireless communication at a device, comprising a processor; memory coupled with the processor; and instructions stored in the memory and executable by the processor to cause the apparatus to perform the method of one or more Aspects of Aspects 21-25.

Aspect 42: A device for wireless communication, comprising a memory and one or more processors coupled to the memory, the memory and the one or more processors configured to perform the method of one or more Aspects of Aspects 21-25.

Aspect 43: An apparatus for wireless communication, comprising at least one means for performing the method of one or more Aspects of Aspects 21-25.

Aspect 44: A non-transitory computer-readable medium storing code for wireless communication, the code comprising instructions executable by a processor to perform the method of one or more Aspects of Aspects 21-25.

Aspect 45: A non-transitory computer-readable medium storing a set of instructions for wireless communication, the set of instructions comprising one or more instructions that, when executed by one or more processors of a device, cause the device to perform the method of one or more Aspects of Aspects 21-25.

Aspect 46: An apparatus for wireless communication at a device, comprising a processor; memory coupled with the processor; and instructions stored in the memory and executable by the processor to cause the apparatus to perform the method of one or more Aspects of Aspects 26-30.

Aspect 47: A device for wireless communication, comprising a memory and one or more processors coupled to the memory, the memory and the one or more processors configured to perform the method of one or more Aspects of Aspects 26-30.

Aspect 48: An apparatus for wireless communication, comprising at least one means for performing the method of one or more Aspects of Aspects 26-30.

Aspect 49: A non-transitory computer-readable medium storing code for wireless communication, the code comprising instructions executable by a processor to perform the method of one or more Aspects of Aspects 26-30.

Aspect 50: A non-transitory computer-readable medium storing a set of instructions for wireless communication, the set of instructions comprising one or more instructions that, when executed by one or more processors of a device, cause the device to perform the method of one or more Aspects of Aspects 26-30.

Aspect 51: A method of wireless communication performed by a first user equipment (UE), comprising: transmitting, to a second UE via a sidelink interface, one or more keep-alive request messages; and performing a link recovery with the second UE based at least in part on the one or more keep-alive request messages satisfying a condition.

Aspect 52: The method of Aspect 51, wherein transmitting the one or more keep-alive request messages comprises transmitting the one or more keep-alive request messages based at least in part on a keep-alive counter value that is less than a keep-alive maximum counter value that triggers a release of local context information at the first UE.

Aspect 53: The method of any of Aspects 51 through 53, wherein performing the link recovery comprises performing the link recovery with the second UE based at least in part on the condition of reaching a keep-alive counter value being satisfied.

Aspect 54: An apparatus for wireless communication at a device, comprising a processor; memory coupled with the processor; and instructions stored in the memory and executable by the processor to cause the apparatus to perform the method of one or more Aspects of Aspects 51-53.

Aspect 55: A device for wireless communication, comprising a memory and one or more processors coupled to the memory, the memory and the one or more processors configured to perform the method of one or more Aspects of Aspects 51-53.

Aspect 56: An apparatus for wireless communication, comprising at least one means for performing the method of one or more Aspects of Aspects 51-53.

Aspect 57: A non-transitory computer-readable medium storing code for wireless communication, the code comprising instructions executable by a processor to perform the method of one or more Aspects of Aspects 51-53.

Aspect 58: A non-transitory computer-readable medium storing a set of instructions for wireless communication, the set of instructions comprising one or more instructions that, when executed by one or more processors of a device, cause the device to perform the method of one or more Aspects of Aspects 51-53.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed at a first user equipment (UE), comprising:
   transmitting, to a second UE via a sidelink interface, one or more keep-alive request messages, in accordance with a keep-alive counter value being less than a keep-alive maximum counter value, wherein the keep-alive maximum counter value triggers a release of local context information at the first UE; and
   performing a link recovery procedure with the second UE based at least in part on the one or more keep-alive request messages satisfying a condition, wherein the condition comprises reaching the keep-alive counter value, and wherein performing the link recovery procedure comprises transmitting beam training reference signals (BT-RSs) until the second UE is rediscovered or until the keep-alive maximum counter is reached.

2. The method of claim 1, wherein transmitting the one or more keep-alive request messages further comprises:
transmitting the one or more keep-alive request messages in accordance with one or more keep-alive parameters defined during a sidelink connection establishment or a sidelink connection update between the first UE and the second UE.

3. The method of claim 1, further comprising:
modifying one or more keep-alive parameters associated with the one or more keep-alive request messages to obtain one or more modified keep-alive parameters; and
transmitting, to the second UE, an indication of the one or more modified keep-alive parameters.

4. The method of claim 3, wherein modifying the one or more keep-alive parameters is in accordance with one or more of measurement reports, or congestion measurements.

5. The method of claim 3, wherein modifying the one or more keep-alive parameters comprises:
modifying the one or more keep-alive parameters to increase a frequency of the one or more keep-alive request messages in accordance with a link quality between the first UE and the second UE not satisfying a threshold.

6. The method of claim 3, wherein modifying the one or more keep-alive parameters comprises:
modifying the one or more keep-alive parameters to decrease a frequency of the one or more keep-alive request messages in accordance with a link quality between the first UE and the second UE satisfying a threshold for a period of time.

7. The method of claim 1, wherein transmitting the one or more keep-alive request messages is in accordance with one or more measurement reports indicating that a link quality between the first UE and the second UE does not satisfy a threshold.

8. The method of claim 1, wherein transmitting the one or more keep-alive request messages is in accordance with one or more of: a quantity of hybrid automatic repeat request transmissions satisfying a threshold, or an indication of a radio link control layer retransmission.

9. The method of claim 1, wherein performing the link recovery procedure comprises:
performing the link recovery procedure until a link between the first UE and the second UE is successfully recovered; or
performing the link recovery procedure until the keep-alive maximum counter value is reached.

10. The method of claim 1, wherein performing the link recovery procedure comprises:
transmitting the BT-RSs until the second UE is rediscovered.

11. The method of claim 1, wherein the keep-alive counter value is reached in accordance with a quantity of keep-alive request messages being transmitted to the second UE without the first UE receiving one or more corresponding keep-alive response messages from the second UE.

12. The method of claim 1, wherein performing the link recovery procedure is in accordance with a first value that represents a quantity of keep-alive request messages being transmitted without receiving one or more corresponding keep-alive response messages from the second UE, and in accordance with a second value that represents a total quantity of keep-alive request messages transmitted to the second UE.

13. The method of claim 1, wherein the local context information comprises information enabling the first UE to maintain a sidelink connection with the second UE.

14. A method of wireless communication performed at a first user equipment (UE), comprising:
receiving, from a second UE via a sidelink interface, a keep-alive request message; and
transmitting, to the second UE and in a next beam training occasion, a keep-alive response message that indicates a link recovery procedure.

15. The method of claim 14, further comprising performing the link recovery procedure in accordance with monitoring a channel for beam training reference signals (BT-RSs) from the second UE.

16. The method of claim 14, further comprising performing the link recovery procedure in accordance with monitoring a channel for beam training reference signals (BT-RSs) until a keep-alive maximum counter value is reached, wherein the channel is monitored for the BT-RSs in accordance with a radio resource control configuration associated with a link between the first UE and the second UE.

17. The method of claim 14, wherein the keep-alive request message is in accordance with one or more keep-alive parameters at the second UE, wherein the one or more keep-alive parameters include a keep-alive counter value.

18. The method of claim 14, wherein the keep-alive request message is in accordance with one or more modified keep-alive parameters, wherein the one or more modified keep-alive parameters are in accordance with one or more of:
measurement reports or congestion measurements.

19. The method of claim 14, wherein the keep-alive request message is in accordance with one or more measurement reports indicating that a link quality between the first UE and the second UE does not satisfy a threshold.

20. The method of claim 14, wherein the keep-alive request message is in accordance with a quantity of hybrid automatic repeat request transmissions satisfying a threshold.

21. A method of wireless communication performed at a first user equipment (UE), comprising:
receiving, from a second UE, one or more keep-alive request messages over a period of time via a sidelink interface between the first UE and the second UE;
determining a block error rate (BLER) associated with the one or more keep-alive request messages received over the period of time; and
performing a link recovery procedure with the second UE in accordance with the BLER satisfying a threshold.

22. The method of claim 21, wherein the period of time is associated with a sliding window.

23. The method of claim 21, wherein the period of time starts from a last beam training or beam recovery process.

24. The method of claim 21, wherein performing the link recovery procedure comprises transmitting, to the second UE, a keep-alive response message that indicates the link recovery procedure.

25. The method of claim 21, wherein performing the link recovery procedure comprises performing the link recovery procedure irrespective of a keep- alive counter value of a current session between the first UE and the second UE.

26. A method of wireless communication performed at a first user equipment (UE), comprising:

transmitting, to a second UE, one or more keep-alive request messages via a sidelink interface between the first UE and the second UE;

determining a block error rate (BLER) for the one or more keep-alive request messages over a period of time in accordance with one or more keep-alive response messages received from the second UE; and performing a link recovery procedure with the second UE in accordance with the BLER satisfying a threshold.

27. The method of claim 26, wherein the period of time is associated with a sliding window.

28. The method of claim 26, wherein the period of time starts from a last beam training or beam recovery process.

29. The method of claim 26, wherein performing the link recovery procedure comprises transmitting, to the second UE, a keep-alive request message that indicates the link recovery procedure.

30. The method of claim 26, wherein performing the link recovery procedure comprises performing the link recovery procedure irrespective of a keep-alive counter value of a current session between the first UE and the second UE.

31. An apparatus for wireless communication at a first user equipment (UE), comprising:

one or more memories; and one or more processors, coupled to the one or more memories, configured to cause the first UE to:

transmit, to a second UE via a sidelink interface, one or more keep-alive request messages, in accordance with a keep-alive counter value that is less than a keep-alive maximum counter value, wherein the keep-alive maximum counter value triggers a release of local context information at the first UE; and perform a link recovery procedure with the second UE based at least in part on the one or more keep-alive request messages satisfying a condition, wherein the condition comprises a satisfaction of the keep-alive counter value, and wherein, to perform the link recovery procedure, the or more processors are configured to cause the first UE to transmit beam training reference signals (BT-RSs) until the second UE is rediscovered or until the keep-alive maximum counter is reached.

32. The apparatus of claim 31, wherein the one or more processors, to transmit the one or more keep-alive request messages, are configured to cause the first UE to:

transmit the one or more keep-alive request messages in accordance with one or more keep-alive parameters defined during a sidelink connection establishment or a sidelink connection update between the first UE and the second UE.

33. The apparatus of claim 31, wherein the one or more processors are further configured to cause the first UE to:

modify one or more keep-alive parameters associated with the one or more keep-alive request messages to obtain one or more modified keep-alive parameters; and transmit, to the second UE, an indication of the one or more modified keep-alive parameters.

34. The apparatus of claim 33, wherein the one or more processors, to modify the one or more keep-alive parameters, are configured to cause the first UE to:

modify the one or more keep-alive parameters in accordance with one or more of: measurement reports, or congestion measurements.

35. The apparatus of claim 33, wherein the one or more processors, to modify the one or more keep-alive parameters, are configured to cause the first UE to:

modify the one or more keep-alive parameters to increase a frequency of the one or more keep-alive request messages in accordance with a link quality between the first UE and the second UE, wherein the link quality does not satisfy a threshold.

36. The apparatus of claim 33, wherein the one or more processors, to modify the one or more keep-alive parameters, are configured to cause the first UE to:

modify the one or more keep-alive parameters to decrease a frequency of the one or more keep-alive request messages in accordance with a link quality between the first UE and the second UE that does not satisfy a threshold for a period of time.

37. The apparatus of claim 31, wherein the one or more processors, to transmit the one or more keep-alive request messages, are configured to cause the first UE to:

transmit the one or more keep-alive request messages in accordance with one or more measurement reports that indicate that a link quality between the first UE and the second UE does not satisfy a threshold.

38. The apparatus of claim 31, wherein the one or more processors, to transmit the one or more keep-alive request messages, are configured to cause the first UE to:

transmit the one or more keep-alive request messages in accordance with one or more of:

a quantity of hybrid automatic repeat request transmissions that satisfy a threshold, or an indication of a radio link control layer retransmission.

39. The apparatus of claim 31, wherein the one or more processors, to perform the link recovery procedure, are configured to cause the first UE to:

perform the link recovery procedure until a link between the first UE and the second UE is successfully recovered; or perform the link recovery procedure until the keep-alive maximum counter value is reached.

40. The apparatus of claim 31, wherein the one or more processors, to perform the link recovery procedure, are configured to cause the first UE to:

transmit the BT-RSs until the second UE is rediscovered.

41. The apparatus of claim 31, wherein the keep-alive counter value is reached in accordance with a quantity of keep-alive request messages that are transmitted to the second UE, and wherein the first UE does not receive one or more corresponding keep-alive response messages from the second UE.

42. The apparatus of claim 31, wherein the one or more processors, to perform the link recovery procedure, are configured to cause the first UE to:

perform the link recovery procedure in accordance with a first value that represents a quantity of keep-alive request messages that are transmitted, wherein one or more corresponding keep-alive response messages are not received from the second UE, and in accordance with a second value that represents a total quantity of keep-alive request messages transmitted to the second UE.

43. The apparatus of claim 31, wherein the local context information comprises information that enables the first UE to maintain a sidelink connection with the second UE.

44. The apparatus of claim 31, wherein the one or more processors, to perform the link recovery procedure, are configured to cause the first UE to:

transmit the BT-RSs until the keep-alive maximum counter value is reached, wherein the BT-RSs are transmitted in accordance with a radio resource control configuration associated with a link between the first UE and the second UE.

45. The apparatus of claim 44, wherein the radio resource control configuration comprises a radio resource control layer of the first UE that indicates an increase to a frequency of the one or more keep-alive request messages.

46. The apparatus of claim 44, wherein the radio resource control configuration comprises a radio resource control layer of the first UE that indicates a decrease to a frequency of the one or more keep-alive request messages.

47. The apparatus of claim 31, wherein the the one or more keep-alive request messages correspond to a proximity services (ProSe) protocol layer of the first UE.

48. An apparatus for wireless communication at a first user equipment (UE), comprising:
one or more memories; and
one or more processors, coupled to the one or more memories, configured to cause the first UE to:
receive, from a second UE via a sidelink interface, a keep-alive request message; and
transmit, to the second UE and in a next beam training occasion, a keep-alive response message that indicates a link recovery procedure.

49. The apparatus of claim 48, wherein the one or more processors are further configured to cause the first UE to:
perform the link recovery procedure in accordance with a monitoring of a channel for beam training reference signals (BT-RSs) from the second UE.

50. The apparatus of claim 48, wherein the one or more processors are further configured to cause the first UE to:
perform the link recovery procedure in accordance with a monitoring of a channel for beam training reference signals (BT-RSs) until a keep-alive maximum counter value is reached, and wherein the channel is monitored for the BT-RSs in accordance with a radio resource control configuration associated with a link between the first UE and the second UE.

51. The apparatus of claim 48, wherein the keep-alive request message is in accordance with one or more keep-alive parameters at the second UE, wherein the one or more keep-alive parameters include a keep-alive counter value.

52. The apparatus of claim 48, wherein the keep-alive request message is in accordance with one or more modified keep-alive parameters, wherein the one or more modified keep-alive parameters are in accordance with one or more of measurement reports, or congestion measurements.

53. The apparatus of claim 48, wherein the keep-alive request message is in accordance with one or more measurement reports that indicate that a link quality between the first UE and the second UE does not satisfy a threshold.

54. The apparatus of claim 48, wherein the keep-alive request message is in accordance with a quantity of hybrid automatic repeat request transmissions that satisfy a threshold.

55. An apparatus for wireless communication at a first user equipment (UE), comprising:
one or more memories; and
one or more processors, coupled to the one or more memories, configured to cause the first UE to:
receive, from a second UE, one or more keep-alive request messages over a period of time via a sidelink interface between the first UE and the second UE;
determine a block error rate (BLER) associated with the one or more keep-alive request messages received over the period of time; and
perform a link recovery procedure with the second UE in accordance with the BLER, wherein the BLER satisfies a threshold.

56. The apparatus of claim 55, wherein the period of time is associated with a sliding window.

57. The apparatus of claim 55, wherein the period of time starts from a last beam training or beam recovery process.

58. The apparatus of claim 55, wherein the one or more processors, to perform the link recovery procedure, are configured to cause the first UE to:
transmit, to the second UE, a keep-alive response message that indicates the link recovery procedure.

59. The apparatus of claim 55, wherein the one or more processors, to perform the link recovery procedure, are configured to cause the first UE to:
perform the link recovery procedure irrespective of a keep-alive counter value of a current session between the first UE and the second UE.

60. An apparatus for wireless communication at a first user equipment (UE), comprising:
one or more memories; and
one or more processors, coupled to the one or more memories, configured to cause the first UE to:
transmit, to a second UE, one or more keep-alive request messages via a sidelink interface between the first UE and the second UE;
determine a block error rate (BLER) for the one or more keep-alive request messages over a period of time in accordance with one or more keep-alive response messages received from the second UE; and
perform a link recovery procedure with the second UE in accordance with the BLER, wherein the BLER satisfies a threshold.

61. The apparatus of claim 60, wherein the period of time is associated with a sliding window.

62. The apparatus of claim 60, wherein the period of time starts from a last beam training or beam recovery process.

63. The apparatus of claim 60, wherein the one or more processors, to perform the link recovery procedure, are configured to cause the first UE to:
transmit, to the second UE, a keep-alive request message that indicates the link recovery procedure.

64. The apparatus of claim 60, wherein the one or more processors, to perform the link recovery procedure, are configured to cause the first UE to:
perform the link recovery procedure irrespective of a keep-alive counter value of a current session between the first UE and the second UE.

65. A non-transitory computer-readable medium storing a set of instructions for wireless communication, the set of instructions comprising:
one or more instructions that, when executed by one or more processors of a first user equipment (UE), cause the first UE to:
transmit, to a second UE via a sidelink interface, one or more keep-alive request messages, in accordance with a keep-alive counter value being less than a keep-alive maximum counter value, wherein the keep-alive maximum counter value triggers a release of local context information at the first UE; and
perform a link recovery procedure with the second UE based at least in part on the one or more keep-alive request messages satisfying a condition, wherein the condition comprises reaching the keep-alive counter value, and wherein, to perform the link recovery procedure, the one or more instructions cause the first UE to perform a beam recovery until the second UE is rediscovered or until the keep-alive maximum counter is reached.

66. A non-transitory computer-readable medium storing a set of instructions for wireless communication, the set of instructions comprising:
one or more instructions that, when executed by one or more processors of a first user equipment (UE), cause the first UE to:
receive, from a second UE via a sidelink interface, a keep-alive request message; and
transmit, to the second UE and in a next beam training occasion, a keep-alive response message that indicates a link recovery procedure.

67. A non-transitory computer-readable medium storing a set of instructions for wireless communication, the set of instructions comprising:
one or more instructions that, when executed by one or more processors of a first user equipment (UE), cause the first UE to:
receive, from a second UE, one or more keep-alive request messages over a period of time via a sidelink interface between the first UE and the second UE;
determine a block error rate (BLER) associated with the one or more keep-alive request messages received over the period of time; and
perform a link recovery procedure with the second UE in accordance with the BLER satisfying a threshold.

68. A non-transitory computer-readable medium storing a set of instructions for wireless communication, the set of instructions comprising:
one or more instructions that, when executed by one or more processors of a first user equipment (UE), cause the first UE to:
transmit, to a second UE, one or more keep-alive request messages via a sidelink interface between the first UE and the second UE;
determine a block error rate (BLER) for the one or more keep-alive request messages over a period of time in accordance with one or more keep-alive response messages received from the second UE; and
perform a link recovery procedure with the second UE in accordance with the BLER satisfying a threshold.

* * * * *